(12) United States Patent  (10) Patent No.: US 8,818,840 B2
Gilpin et al.  (45) Date of Patent: *Aug. 26, 2014

(54) CAPACITY MANAGEMENT INDEX SYSTEM AND METHOD

(76) Inventors: Brian M. Gilpin, Novato, CA (US); Gregory Alan Reber, Larkspur, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/617,854

(22) Filed: Sep. 14, 2012

(65) Prior Publication Data

US 2013/0159053 A1  Jun. 20, 2013

Related U.S. Application Data

(62) Division of application No. 11/326,959, filed on Jan. 5, 2006, now Pat. No. 8,355,938.

(51) Int. Cl.
*G06Q 10/00* (2012.01)
*G06Q 30/00* (2012.01)
*G06Q 30/02* (2012.01)

(52) U.S. Cl.
CPC ................................ *G06Q 30/0202* (2013.01)
USPC ..................... 705/7.31; 705/7.36; 705/7.37

(58) Field of Classification Search
CPC ................................................. G06Q 30/0202
USPC ....................................... 705/7.31, 7.36, 7.37
See application file for complete search history.

(56) References Cited

U.S. PATENT DOCUMENTS

| | | |
|---|---|---|
| 4,524,418 A | 6/1985 | Araya et al. |
| 4,567,566 A | 1/1986 | Araya et al. |
| 4,612,624 A | 9/1986 | Tsuji |
| 4,663,723 A | 5/1987 | Umeda |
| 5,459,656 A | 10/1995 | Fields et al. |

(Continued)

FOREIGN PATENT DOCUMENTS

| | | |
|---|---|---|
| EP | 1310845 A4 | 4/2004 |
| EP | 1310845 A1 | 11/2005 |

(Continued)

OTHER PUBLICATIONS

Anticipate Problems, Map Changes—Software That Sees the Future Rutrell Yasin. InternetWeek. Manhasset: Sep 4, 2000., Iss. 827; p. 1.*

(Continued)

*Primary Examiner* — Peter Choi
*Assistant Examiner* — Timothy Padot
(74) *Attorney, Agent, or Firm* — Merchant & Gould P.C.

(57) ABSTRACT

A system and method is provided that generates an index, providing predictive and actionable intelligence to ensure that a Technology Infrastructure Group (TIG) makes tactical and strategic decisions in support of needs of customers. The invention measures overall health of an infrastructure, specifically with respect to how efficiently various services meet demand placed upon capacity by various Lines of Business. The invention provides an overall assessment of infrastructure capacity management and drills down to various services, components, subcomponents, etc. The invention provides a forecasting tool in which estimates made are not based only upon business forecasts provided by each Line of Business, but also upon forecasts developed by correlating external indicators with historical business volumes. Historical forecasts are compared to actual values to derive a confidence factor used for weighting future Line of Business forecasts. The combined, weighted forecasts obtained are more robust than any individual forecasts on their own.

6 Claims, 13 Drawing Sheets

(56) References Cited

U.S. PATENT DOCUMENTS

| | | | |
|---|---|---|---|
| 5,680,325 A | 10/1997 | Rohner | |
| 5,862,342 A | 1/1999 | Winter et al. | |
| 5,884,187 A | 3/1999 | Ziv et al. | |
| 6,363,363 B1 | 3/2002 | Haller et al. | |
| 6,446,980 B1 | 9/2002 | Kutscher et al. | |
| 6,463,454 B1 | 10/2002 | Lumelsky et al. | |
| 6,516,350 B1 | 2/2003 | Lumelsky et al. | |
| 6,594,496 B2 | 7/2003 | Schwartz | |
| 6,721,750 B1 | 4/2004 | Jones et al. | |
| 6,738,736 B1* | 5/2004 | Bond | 703/2 |
| 6,826,538 B1* | 11/2004 | Kalyan et al. | 705/7.25 |
| 6,839,321 B1 | 1/2005 | Chiruvolu | |
| 7,444,272 B2* | 10/2008 | Alvarez et al. | 703/2 |
| 7,590,508 B1* | 9/2009 | Saghier et al. | 702/182 |
| 2002/0037730 A1 | 3/2002 | Schwartz | |
| 2002/0067802 A1 | 6/2002 | Smith et al. | |
| 2002/0072956 A1 | 6/2002 | Willems et al. | |
| 2002/0091991 A1 | 7/2002 | Castro | |
| 2002/0166002 A1 | 11/2002 | Milner et al. | |
| 2002/0194326 A1 | 12/2002 | Gold | |
| 2003/0028642 A1 | 2/2003 | Agarwal et al. | |
| 2003/0055676 A1 | 3/2003 | Huneycutt | |
| 2003/0065557 A1 | 4/2003 | Hoffman et al. | |
| 2003/0078818 A1 | 4/2003 | Hoffman et al. | |
| 2003/0083919 A1 | 5/2003 | Hammann | |
| 2003/0115244 A1 | 6/2003 | Molloy et al. | |
| 2003/0125996 A1* | 7/2003 | Bush et al. | 705/7 |
| 2003/0208389 A1 | 11/2003 | Kurihara et al. | |
| 2004/0010592 A1 | 1/2004 | Carver et al. | |
| 2004/0093361 A1 | 5/2004 | Therrien et al. | |
| 2004/0095907 A1 | 5/2004 | Agee et al. | |
| 2004/0148498 A1 | 7/2004 | Circenis | |
| 2004/0186905 A1 | 9/2004 | Young et al. | |
| 2004/0240385 A1 | 12/2004 | Boggs et al. | |
| 2004/0246905 A1 | 12/2004 | Dunagan et al. | |
| 2006/0161884 A1* | 7/2006 | Lubrecht et al. | 717/104 |
| 2007/0038493 A1* | 2/2007 | Subrahmonia et al. | 705/8 |

FOREIGN PATENT DOCUMENTS

| | | |
|---|---|---|
| EP | 1310845 B1 | 11/2005 |
| WO | 9734439 A1 | 9/1997 |
| WO | 0125876 A2 | 4/2001 |
| WO | 0139029 A2 | 5/2001 |
| WO | 0139029 A9 | 5/2001 |
| WO | 0152475 A2 | 7/2001 |
| WO | 0125876 A3 | 8/2001 |
| WO | 0184865 A1 | 11/2001 |
| WO | 0152475 A3 | 1/2002 |
| WO | 0210872 A1 | 2/2002 |
| WO | 0229685 A1 | 4/2002 |
| WO | 0239680 A2 | 5/2002 |
| WO | 02039680 A3 | 10/2002 |
| WO | 01039029 A8 | 1/2003 |
| WO | 03005735 A1 | 1/2003 |
| WO | 03025701 A2 | 3/2003 |
| WO | 03025898 A1 | 3/2003 |
| WO | 03038722 A1 | 5/2003 |
| WO | 03052590 A1 | 6/2003 |
| WO | 03025898 A9 | 8/2003 |
| WO | 03038722 A8 | 8/2003 |
| WO | 03025701 A3 | 9/2003 |
| WO | 03025701 A9 | 10/2003 |
| WO | 03098517 A1 | 11/2003 |

OTHER PUBLICATIONS

Fortel Equips SightLine(TM) With Service Level ForSight(TM)PR Newswire. New York: Sep. 21, 2000. p. 1.*

Castela, N. et al., Business Process Modeling with UML, Escola Superior de Tecnologia de Castelo Branco/INESC-CEO, Portugal, 2001, 6 pages.

Davulcu, H. et al., "Logic Based Modeling and Analysis of Workflows" Department of Computer Science, Stony Brook University, Stony Brook, New York, USA, 1998, 8 pages.

Davulcu, H. et al., "Modeling and Analysis of Interactions in Virtual Enterprises" Department of Computer Science, Stony Brook University, Stony Brook, New York, USA, 2001, 20 pages.

McCoy, D. et al., "District Expenditure and Resource Allocation Reviews for Effective DHS Management" A review Expenditure and Resource Allocation in the Mount Frere Health District, published 1998, 40 pages.

Santos, C. et al., "A Mathematical Optimization Approach for Resource Allocation in Large Scale Data Centers" Hewlett Packard Labs, Palo Alto, CA, USA, 2002, 24 pages.

Sweet, P., Storage at a Price [Infrastructure Management System] Conspectus, Prime Marketing Publications, United Kingdom, 2003, pp. 2-4.

Umar, A. et al., A Framework for Analyzing Virtual Enterprise Infrastructure, Bellcore@notes.cc.bellcore , published 1999, 8 pages.

Yasin, Rutrell; "Anticipate Problems, Map Changes—Software that Sees the Future" InternetWeek, Manhasset, Issue 827, Sep. 4, 2000, 5 pages.

"Fortel Equips SightLine (TM) With Service Level ForSight (TM)" PR Newswire, New York, Sep. 21, 2000, 3 pages.

* cited by examiner (Correlation Coefficient: -0.856)

(Correlation Coefficient: 0.889)

us 8,818,840 B2

CAPACITY MANAGEMENT INDEX SYSTEM AND METHOD

BACKGROUND OF THE INVENTION

1. Technical Field

The invention relates to generating on a computer network an infrastructure index. More particularly, the invention relates to a system and method on a computer network for generating an index that provides predictive and actionable intelligence to a technology infrastructure group to make tactical and strategic decisions.

2. Description of the Prior Art

Business volume forecasts have been historically inaccurate for a number of reasons. Relationships of business volumes to actual demand on infrastructure have not been determined to a fine enough aspect to make strategic decisions on capacity management. Business volume is currently predicted using methods that are not rigorous. Therefore, demand on infrastructure is subsequently predicted using these forecasts and straight line trending.

As corporation's technology infrastructure becomes larger and more complex, the ability to match demand with capacity precisely, erring on neither the side of having too much or too little capacity, becomes more difficult and unpredictable. The typical result is that the organization chooses to maintain an expensive capacity buffer, instituted to minimize the risk that capacity might be exceeded. It would therefore be advantageous to improve a technology infrastructure group's capacity management by better understanding capacity demand, i.e. to match the requirements of the various business units with infrastructure capacity in a way that minimizes risk and cost.

It would be advantageous to increase confidence in infrastructure capacity reporting as compared with demand from internal customers of an enterprise.

It would further be advantageous to develop an index which provides predictive and actionable intelligence in order to ensure a technology infrastructure group (TIG) can make tactical and strategic decisions to be prepared to support the needs of its customers on a timely basis.

It would further be advantageous to increase customer satisfaction and reduce time to market for an enterprise's products and services.

It would further be advantageous for an enterprise to have a better sense of an overall need of the organization to enable optimization of resources across the enterprise and to lead to a higher return on such assets.

SUMMARY OF THE INVENTION

A system and method that generates an index that provides predictive and actionable intelligence to ensure that a Technology Infrastructure Group can make tactical and strategic decisions in support of the needs of customers is provided. In particular, the invention measures the overall health of the infrastructure provided by the Technology Infrastructure Group, specifically with respect to how efficiently the Technology Infrastructure Group's various services meet the demand placed upon their capacity by various Lines of Business. The invention provides an overall assessment of infrastructure capacity management and can then drill down to the various services, components, subcomponents, etc., that make up the infrastructure as a whole. Additionally, the invention provides a forecasting tool in which estimates made are not based only upon business forecasts provided by each Line of Business, but also upon forecasts developed by correlating indicators external to the enterprise with historical business volumes. Historical forecasts are also compared to actual values to derive a confidence factor that is used for weighting future Line of Business forecasts. The combined, weighted forecasts thus obtained are more robust than any of the individual forecasts on their own.

DETAILED DESCRIPTION OF THE INVENTION

Figure 1:
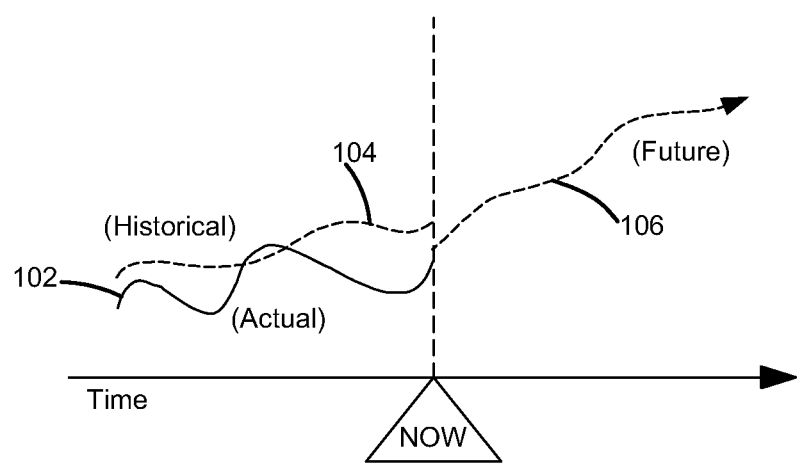
FIG. 1 is a graph of demand forecasting upon various lines of business into the CMI algorithm according to the invention.

One embodiment of the invention provides a Capacity Management Index (CMI) that measures the overall health of the infrastructure provided by the Technology Infrastructure Group (TIG), specifically with respect to how efficiently the TIG's various services meet the demands placed upon their capacity by the various lines of business. In one embodiment of the invention, an overall assessment of infrastructure capacity management is attained and then ability to drill down into the various services, components, subcomponents, etc., that make up the infrastructure as a whole is provided.

In addition to being a tool that measures past performance, an embodiment of the invention is provided in which the CMI is a forecasting tool. As a forecasting tool, the estimates made by the CMI are based not only upon the business forecasts provided by each line of business, but also upon forecasts developed by correlating indicators external to an enterprise, such as Wells Fargo, with historical business volumes. In the embodiment of the invention, historical forecasts are compared to actual values to derive a confidence factor that is used for weighting future line of business forecasts. The combined, weighted forecasts thus obtained are more robust than any of the individual forecasts on their own.

It should be appreciated that the provided index summarizes measured and forecast demand to capacity ratio in a form that is easily conveyed to facilitate strategic decisions on infrastructure capacity growth. The process of constructing and utilizing the CMI can encourage the lines of business to refine their metrics gathering processes so that forecasts reported to the TIG can be used with greater confidence. Improving the overall capacity planning for the needs of the organization can improve optimization of resources across the enterprise, while reducing the risk of insufficient capacity, leading to a higher return on these assets.

Herein, an exemplary discussion of the CMI system and method is presented in reference to a particular Proof of Concept. The CMI model within the Proof of Concept consists of three major deliverables, as follows:

Algorithm—The algorithm is the mathematical basis for the CMI and is presented herein in a step-by-step fashion using mathematical notation in order to clearly convey the information.

Methodology—The methodology is the approach used for applying the algorithm across all Lines of Business and TIG Services to build the model.

Spreadsheet—The spreadsheet is a prototype constructed by using the methodology to apply the algorithm in order to determine the CMI based upon the demand on a single Service Component by a single Line of Business.

Overview

Using the Greek symbol kappa (K) to symbolize the overall CMI, the concept is expressed in an abstract sense as Demand (D) over Capacity (k):

$$K = \frac{D}{k}$$

However, it should be appreciated that different infrastructure Services and Components measure capacity in different ways. For example, the metric for one component might be Gigabytes (Gb) of hard disk storage space, while the metric for another component might be Millions of Instructions Per Second (MIPS). To accommodate these disparate units and effectively compare apples to oranges, the following basic algorithm can be applied:

$$K \equiv \frac{1}{n}\sum_{s=1}^{n} W_s \frac{1}{m_s} \sum_{c=1}^{m_s} W_c \frac{D_c}{k_c}$$

The Capacity Management Index (K) is defined as the weighted sum of the Demand ($D_c$) for a given infrastructure Service Component divided by the Capacity ($k_c$) of that Component, and weights this quotient across all Components (C) and across all Services (S).

The predicted demand on a component is the weighted combination of the demand predicted by correlation with external factors and the demand predicted by business unit forecasts adjusted for historical accuracy of that business unit's previous forecasts, as follows:

$$K_{CombinedForecast} \equiv \frac{1}{n}\sum_{s=1}^{n} W_s \frac{1}{m_s}\sum_{c=1}^{m_s} W_c \frac{\sum_{i=1}^{b}\left( W_{WEIF} \sum_{Ext=1}^{\#Ext_i} W_{Ext} D_{c_{I_{Ext}}} + W_{WIF} \sum_{Int=1}^{\#Int_i} W_{Int} D_{c_{I_{Int}}} \right) + D_{c_O} + D_{c_B}}{k_c}$$

Algorithm Development

This section illustrates the step-by-step development of the CMI algorithm according to one embodiment of the invention. It should be appreciated that specific references, such as to the Technology Infrastructure Group (TIG) and to Wells Fargo are by way of example only and are not meant to be limiting. Further, it should further be appreciated that the scope of the invention is not limited to any specific business entity, but is described in the context of demands by various of lines of business of an enterprise on the services offered by the enterprise's technology infrastructure group and is not meant to be limiting.

Overview

This section provides a basic, top down approach to understanding the algorithm in one embodiment of the invention.

The Technology Infrastructure Group (TIG) offers a number of Services in support of the activities of various Lines of Business that make up the enterprise, such as Wells Fargo, for example. Each Line of Business places a certain demand upon a given Service provided by TIG.

In order to meet these demands efficiently, each Service maintains sufficient capacity to meet Line of Business demands, plus an allotment reserved for system overhead, plus an additional allotted buffer to cover peak periods of usage. If there was only one Service and only one Line of Business, the equation for the CMI would look like this:

$$\text{Capacity Managment Index} = \frac{\text{Demand} + \text{Overhead} + \text{Buffer}}{\text{Total Capacity}}$$

The ideal CMI value in this model is equal to one. If the CMI value is less than one, there is an excess of capacity, which means money is being wasted. If the CMI value is greater than one, there is insufficient capacity to meet demand, which means that business opportunities are being lost. Therefore, the ideal CMI value in this context is one.

The real world is rather more complicated than this simple model. Not only are there more than one Line of Business making demands, but there are many Services involved, each of which may be decomposed into Components, Subcomponents, etc. In addition, demand and capacity for each of these Services is measured quite differently, so one is very much dealing with a world of apples and oranges. What the Capacity Management Index (CMI) provides is a way of gathering such disparate Service metrics together in order to both assess past performance and achieve better performance in the future with respect to efficiently meeting infrastructure Service demands.

Symbols and Subscripts

This section defines the symbols and subscripts that are used in herein for constructing the CMI Algorithm.

Capacity Management Index (CMI) Symbols & Subscripts

K Capacity Management Index (CMI)

Service Symbols & Subscripts

The following symbols and subscripts apply to infrastructure Services.

S Service Index
s Counter for Services
n Total number of Services

It should be appreciated that there are currently four Services, i.e. n=4 under consideration in this example model and their respective capacity indexes are denoted as follows:

$S_1$=Network
$S_2$=Middleware
$S_3$=Enterprise Messaging
$S_4$=Hardware Capacity & Storage Service Component Symbols & Subscripts The following symbols and subscripts apply to Components of infrastructure Services.

C Component Index
c Counter for Components
$m_s$ Total number of Components for a given Service
$D_c$ Demand for a given Component
$k_c$ Actual capacity of a given Component
$O_c$ Overhead of a given Component, specification of capacity required for system operations
$B_c$ Buffer of a given Component, specification of capacity reserved for contingencies Each Service breaks down into Components. For example, the Hardware Capacity and Storage Service ($S_1$) breaks down into four components, as follows:

$C_1$=Mainframe CPU
$C_2$=Direct Access Storage Devices (DASD)
$C_3$=Midrange CPU
$C_4$=Distributed Systems Similarly, Components could be further broken down into Subcomponents. For example, the Component Mainframe CPU can consist of Subcomponents corresponding to the various environments, such as "Shareable", "Non-Shareable", etc.

Line of Business Symbols & Subscripts

The following symbols and subscripts apply to Lines of Business.

L Line of Business
l Counter for Lines of Business
b Total number of Lines of Business It should be appreciated that there are currently four Lines of Business in this example, i.e. b=4 with which the CMI is concerned, as follows:

$L_1$=Wells Fargo Home Mortgage (WFHM)
$L_2$=Wholesale (W)
$L_3$=Internet Services Group (ISG)
$L_4$=Private Client Services (PCS)

External Indicator Symbols & Subscripts

The following symbols and subscripts apply to Econometric quantities used as external predictors within the Capacity Management Index (CMI).

E External Indicator
e Counter for External Indicators

Examples of External Indicators employed within the Capacity Management Index model include the following econometric indices:

$E_1$=10-Year Treasury Interest Rate
$E_2$=Unemployment Rate

Miscellaneous Symbols & Subscripts

The following are additional symbols and subscripts that appear within the Capacity Management Index.

W Weighting factor, typically identified by its index
F Forecast confidence factor
A Actual value
H Historical forecast value
F Future forecast value Summation Symbols & Subscripts Much of the CMI consists of aggregating data from a set of similar objects, such as a set of Services, a set of Components, etc. This can be most concisely expressed in mathematics using summation symbols. For the purpose of review, the use of summation symbols is illustrated by expressing the arithmetic average ($\bar{x}$) which is defined as the sum of a given series divided by the number of elements in that series, using the mathematical symbols for summation as follows:

$$\bar{x} \equiv \frac{1}{n}\sum_{i=1}^{n} x_i = \frac{x_1 + x_2 + \ldots + x_n}{n}$$

In the above equation, "x" is a variable and "i" is an index that ranges from 1 to n, so that $x_1$ (commonly referred to as "x one" or "x sub one") is the first instance of x, while $x_2$ is the second instance of x ("x two" or "x sub two", etc.), and so on until the terminal value n of the index is reached and the last value for x, which is represented as $x_n$, is obtained. As n is the number of instances of the variable x, to obtain the average value of x, written as "$\bar{x}$" and referred to as "x bar", the values of $x_1$ through $x_n$ are added up and then divide by n.

Also, the distinction between the symbols "≡" and "=" is that the former means "is defined as" and the latter means "is equal to", the difference being that in using the former, the indication is that the relationship between one side and the other is true because that is how the term on the left is defined, while in using the latter the indication is that the relationship may be derived from axioms and proven theorems.

Derivation of the Capacity Management Index (CMI)

Basic Algorithm

The following section documents the basic algorithm of the Capacity Management Index (CMI). Main steps of an embodiment of the invention can be described with reference to FIG. 6b, a schematic flow diagram.

The Capacity Management Index (K) is defined as the sum of all Service Indices ($S_s$), weighted according to the significance of their individual contributions (600), or $$K \equiv \frac{1}{n}\sum_{s=1}^{n} W_s S_s = \frac{W_1 S_1 + W_2 S_2 + \ldots + W_n S_n}{n} \quad [1]$$

It should be appreciated that to normalize K, one could require the sum of all Service weights be equal to one:

$$\sum_{s=1}^{n} W_s = 1$$

However, at present, all Services are given the equal weight of $W_s$=1.

Similarly, the Service Index ($S_s$) is defined as the sum of all Component Indices ($C_c$) for that Service, weighted according to the relative importance of their individual contributions (602), or $$S_s \equiv \frac{1}{m_s}\sum_{c=1}^{m_s} W_c C_c = \frac{W_1 C_1 + W_1 C_1 + \ldots + W_{m_s} C_{m_s}}{m_s} \quad [2]$$

It should be appreciated that to normalize $S_s$, one could require the sum of all Component weights be equal to one:

$$\sum_{c=1}^{m_s} W_c = 1$$

However, at present, all Components are given the equal weight of $W_c=1$.

The Component Index ($C_c$) for a given component is defined as the ratio of the demand ($D_c$) for that Component to the capacity ($k_c$) of that Component (604), or $$C_c \equiv \frac{D_c}{k_c} \quad [3]$$

As such, a given Component Index ($C_c$) may be interpreted as follows (606):
$C_c<1$ Capacity exceeds Demand
$C_c=1$ Capacity equals Demand
$C_c>1$ Demand exceeds Capacity Inserting (608) the definition of the Component Index ($C_c$) [equation 3] into the definition for the Service Index ($S_s$) [equation 2], one gets:

$$\begin{aligned}S_s &\equiv \frac{1}{m_s}\sum_{c=1}^{m_s} W_c C_c \\ &= \frac{1}{m_s}\sum_{c=1}^{m_s} W_c \frac{D_c}{k_c} \\ &= \frac{W_1\frac{D_1}{k_1} + W_2\frac{D_2}{k_2} + \ldots + W_{m_s}\frac{D_{m_s}}{k_{m_s}}}{m_s}\end{aligned} \quad [4]$$

Similarly, by inserting (608) the expanded definition of the Service Index ($S_s$) [equation 4] into the definition for the CMI ($K$) [equation 1], one gets:

$$\begin{aligned}K &\equiv \frac{1}{n}\sum_{s=1}^{n} W_s S_s \\ &= \frac{1}{n}\sum_{s=1}^{n} W_s \frac{1}{m_s}\sum_{c=1}^{m_s} W_c C_c \\ &= \frac{1}{n}\sum_{s=1}^{n} W_s \frac{1}{m_s}\sum_{c=1}^{m_s} W_c \frac{D_c}{k_c}\end{aligned} \quad [5]$$

It should be appreciated that the above CMI ($K$) represents the aggregate index over all Lines of Business ($L$) (608), for example, a capacity utilization index or indicating actual capacity and demand per platform. The next step in the development of the business is decomposing the demand for a given component ($D_c$) into its constituent components, representing the individual demands of each Line of Business ($D_{cl}$) as follows:

$$D_c = \sum_{l=1}^{b} D_{c_l} \quad [6]$$

Substituting demand by Line of Business [equation 6] into the definition of the CMI ($K$) [equation 5], one gets:

$$K \equiv \frac{1}{n}\sum_{s=1}^{n} W_s \frac{1}{m_s}\sum_{c=1}^{m_s} W_c \frac{D_c}{k_c} = \frac{1}{n}\sum_{s=1}^{n} W_s \frac{1}{m_s}\sum_{c=1}^{m_s} W_c \frac{\sum_{l=1}^{b} D_{c_l}}{k_c} \quad [7]$$

At this point, it is beneficial to explore further the concept of a Component's Demand ($D_c$). What is referred to in the above equation as the Demand for a given Component should not only include the sum of the Demands placed by the various Lines of Business, but also such considerations as capacity devoted to system overhead ($D_o$) and dedicated buffers ($D_b$) to allow for unplanned spikes in usage:

$$D_c = \sum_{l=1}^{b} D_{c_l} + D_o + D_b. \quad [8]$$

However, these additional Demand considerations may be incorporated into the model simply by recognizing them as the demands of TIG (610). Therefore, the model developed thus far, as expressed in equation 7, need not be altered to accommodate overhead and buffer requirements, as the TIG may be viewed as simply another Line of Business.

In conclusion, the aggregate CMI ($K$) is defined as the weighted average overall Services of the weighted average overall Components of the demand placed by all Lines of Business, including TIG, upon a given Component divided by the capacity of that Component. Where desired, this analysis may be continued further, breaking down measurement of the supply and demand of capacity over sub-components, sub-sub-components, etc.

Demand Forecasting

This section incorporates demand forecasting upon the part of the various Lines of Business into the CMI algorithm (612).

The distinction between an historical forecast value and a future forecast value is that historical forecast refers to the time period for which the forecast was targeted has passed, whereas the time period targeted by a future forecast has yet to arrive. In other words, future forecasts become historical forecasts once their time has come.

As illustrated in the following FIG. 1, a graph of demand forecasting upon various lines of business into the CMI algorithm 100, actual measurements are reflected by the solid line 102, while forecast values are represented by the dotted line. Historical forecast values 104 are those prior to the moment "Now", while future forecast values 106 extend from "Now" to the future.

Comparing historical forecast values to actual values enables one to measure the effectiveness of one's forecasting ability. This knowledge may be used to derive a confidence factor with which to improve the predictive accuracy of future forecast values.

Below is a review of the definition of the CMI expressed in equation 7:

$$K \equiv \frac{1}{n}\sum_{s=1}^{n} W_s \frac{1}{m_s}\sum_{c=1}^{m_s} W_c \frac{D_c}{k_c} = \frac{1}{n}\sum_{s=1}^{n} W_s \frac{1}{m_s}\sum_{c=1}^{m_s} W_c \frac{\sum_{l=1}^{b} D_{c_l}}{k_c} \quad [7]$$

When the above equation is populated with measured data, K represents the Actual CMI, which can be denoted as $K_{Actual}$. One could also populate the above equation with forecast data, in which case K would represent either an Historical or a Future forecast CMI, denoted as $K_{Historical}$ and $K_{Future}$, respectively (614).

To improve the predictive value of future forecasts, one can include within the model a confidence factor (F) that is based upon the observed deviance of historical forecast values from actual, measured values (616).

Figure 2:
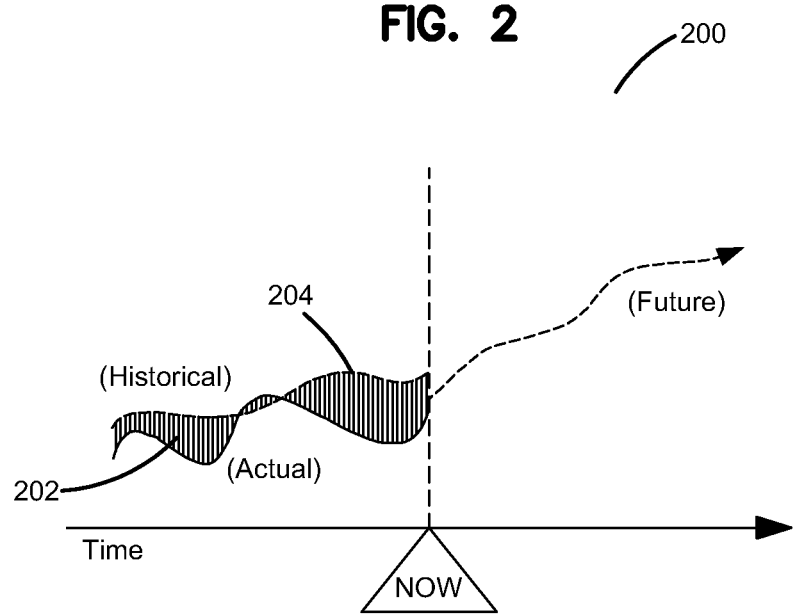
FIG. 2 is a graph showing the deviation of the historical forecast from the actual values of demand forecasting upon various lines of business into the CMI algorithm according to the invention.

Referring to FIG. 2, a graph showing the deviation of the historical forecast from the actual values of the demand forecast 200, the shaded area 202 represents the deviation of the historical forecast from the actual values. It should be appreciated that in some cases the Historical forecast 204, represented by the dotted line prior to "Now", is in some cases less than and in some cases greater than the actual value. In statistical terms, the difference between a forecast and a measured value is called a deviation.

One can measure the typical deviation of the historical forecast from the actual value, e.g. the standard deviation, and use this to derive an interval that one can place about the future forecast values such that one has some acceptable percentage confidence, e.g. 95% percentage confidence, that actual values in the future fall within this range. Thus the term for the future forecast for the demand placed upon a given Component by a given Line of business can be represented as follows:

$$D_{c_{l_{Forecast}}} = D_{c_l} \pm F_{c_l} \quad [9]$$

Incorporating the above term into the current definition of the CMI [equation 7], results in the following:

$$K \equiv \frac{1}{n}\sum_{s=1}^{n} W_s \frac{1}{m_s}\sum_{c=1}^{m_s} W_c \frac{\sum_{l=1}^{b} (D_{c_l} \pm F_{c_l})}{k_c} \quad [10]$$

Figure 3:
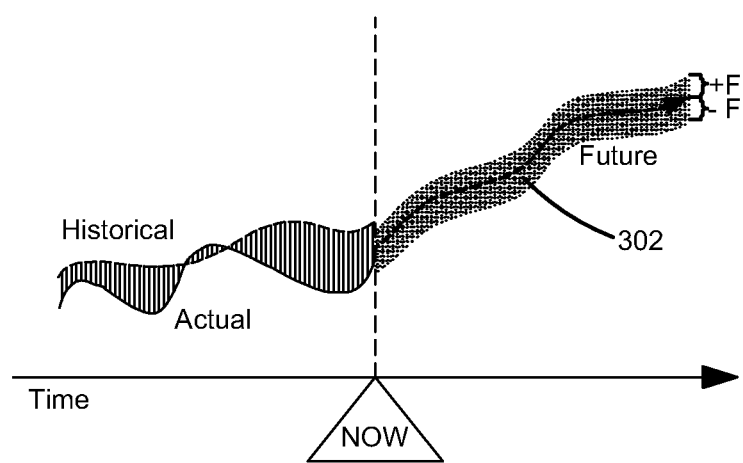
FIG. 3 is a graph of demand forecasting upon various lines of business into the CMI algorithm showing a confidence interval according to the invention.

FIG. 3 graphically illustrates such a confidence interval as a region that extends above and below the future forecast line 302.

Rather than a single value, one now has a range of possible values that the forecast can attain for each point in time. What might be lost in precision is gained in confidence that what one expects to observe falls within the range of estimates.

At this point, three equations are considered one for the actual, historical forecast, and future forecast values of the Capacity Management Index (K), denoted as follows:

$$K_{Actual} \equiv \frac{1}{n}\sum_{s=1}^{n} W_s \frac{1}{m_{s^*}}\sum_{c=1}^{m_s} W_c \frac{\sum_{l=1}^{b} D_{c_{l_{Actual}}}}{k_c}, \quad [10a]$$

based on Actual values of demand $$K_{Historical} \equiv \frac{1}{n}\sum_{s=1}^{n} W_s \frac{1}{m_s}\sum_{c=1}^{m_s} W_c \frac{\sum_{l=1}^{b} D_{c_{l_{Historical}}}}{k_c}, \quad [10b]$$

based on Historical forecast values of demand $$K_{Future} \equiv \frac{1}{n}\sum_{s=1}^{n} W_s \frac{1}{m_s}\sum_{c=1}^{m_s} W_c \frac{\sum_{l=1}^{b} D_{c_{l_{Future}}} \pm F_{c_l}}{k_c}, \quad [10c]$$

based on Future forecast values of demand

Finally, the concept that the further out one forecasts, the greater the uncertainty, can be included. In other words, the further out a forecast seeks to predict, the less accurate that forecast is expected to be because the probability increases that unforeseen circumstances may arise to influence the outcome.

Figure 4:
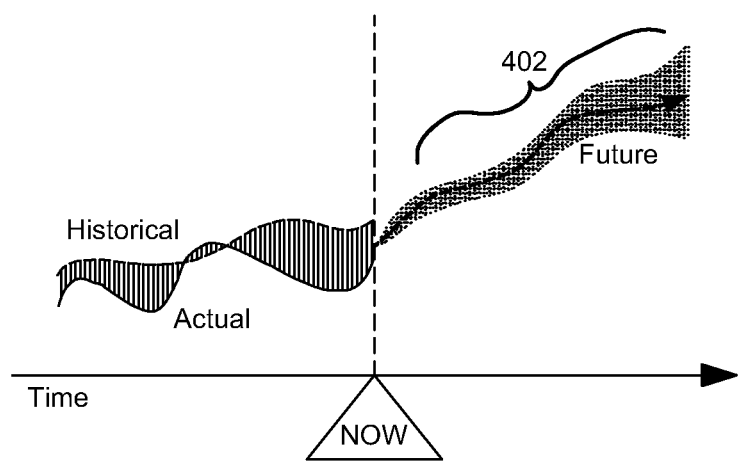
FIG. 4 is a graph of demand forecasting upon various lines of business into the CMI algorithm showing the decreasing accuracy of the forecast as a widening of the confidence interval over time according to the invention.

Graphically, the decreasing accuracy of the forecast as a widening of the confidence interval 402 over time is illustrated in FIG. 4. It should be appreciated that the estimate is very precise at "Now" because presumably the current situation is known. The farther out the prediction goes, the more one has to widen the prediction to continue to have the same confidence level that the expected value, once measured, falls within the range of estimates.

Mathematically, this concept may be included within the model by adjusting the confidence factor (F) by a time-based factor (T) (618) so that the term for the future forecast for the demand placed upon a given Component by a given Line of business [equation 9] can be represented as follows:

$$D_{c_{l_{Forecast}}} = D_{c_l} \pm (F_{c_l} + F_{c_l} T_t) \quad [11]$$

where $T_t$ is a function of time.

For example, the function $T_t$ might be 0.1 times the number of months from now that the forecast represents ($T_t$=0.1×t). In the case where the forecast is for now (t=0), the time-based factor drops out altogether. As the forecast extends farther and farther out, i.e. as t increases, the time-based factor becomes larger and larger, which in turn expands the confidence factor (F) term, causing an increase in the range of possibility for the future forecast value.

Collecting terms, the above equation may be written as follows:

$$D_{c_{l_{Forecast}}} = D_{c_l} \pm F_{c_l}(1 + T_t) \quad [12]$$

Substituting this equation into the future forecast equation for the Capacity Management Index [equation 10c], the following is obtained:

$$K_{Future} \equiv \frac{1}{n}\sum_{s=1}^{n} W_s \frac{1}{m_s}\sum_{c=1}^{m_s} W_c \frac{\sum_{l=1}^{b}(D_{c_{l_{Future}}} \pm F_{c_l}(1+T_t))}{k_c} \quad [13]$$

External Indicators

This section incorporates External Indicators into the Capacity Management Index (CMI) algorithm.

"A rising tide lifts all boats."

This saying makes the reasonable assumption of a correlation between external events and the behavior of internal systems. For example, a thriving economy could be expected to be reflected by the flourishing of internal business functions, which would make increased demands upon the services supporting these activities. This chain of relationships may be summarized as follows:

External Factors→Internal Business→Service Demand

The process by which external factors are included within the Capacity Management Index (CMI) is relatively simple to express (620):

- Establish correlation between external factor and internal business metric, e.g. the relationship between the unemployment rate and loan funding.
- Establish correlation between internal business metric and service metric, e.g. the relationship between loan funding and the demand for mainframe peak CPU seconds.
- Use the equations derived in steps one and two to define the relationship between external factors and service demand, e.g. the relationship between the unemployment rate and the demand for mainframe peak CPU seconds.

The above process is further detailed in the section Modeling Methodology, hereinbelow.

Once the relationship has been established between an External Indicator and the demand for a given service, a Capacity Management Index (K) for a given External Indicator ($E_e$) may be constructed around that factor, as follows:

$$K_{Ee} \equiv \frac{1}{n}\sum_{s=1}^{n} W_s \frac{1}{m_s}\sum_{c=1}^{m_s} W_c \frac{\sum_{l=1}^{b}(D_{E_e} \pm F_{c_l}(1+T_t))}{k_c} \quad [14]$$

A given Line of Business may develop a set of demand forecasts based upon different business volume metrics. In such a case, it may be desirable to combine the different forecasts, weighting each according to the strength of its correlation with actual values.

Combined Forecasts

This section explains how a Combined Capacity Management Index is formed comprising a set of Future forecasts ($K_{Future}$) based upon Line of Business volume metrics and a set of forecasts based upon External Indicators' ($K_{External}$).

At this point, a number of equations for the Capacity Management Index (K) have been developed as follows:

$K_{Actual}$ (or $K_A$) is based on Actual values, and so represents past performance, in terms of the organization's ability to meet the demand for infrastructure services.

$K_{Historical}$ (or $K_H$) is based on Historical Forecast values, and so represents the ability of the organization to predict its demand (when compared with $K_{Actual}$).

$K_{Future}$ (or $K_F$) is based on Future Forecast values, and represents the organizations current estimate of future demand.

$K_{External}$ (or $K_{Ee}$) is based upon External Indicators, and represents an estimate of future demand derived from factors measured outside the boundaries of the organization.

To arrive at a more robust and objective forecast (622), one can combine the set of internal Future forecasts ($K_{Future}$) with the set of External Indicators ($K_{Ee}$), weighted such that a given forecast's contribution to the Combined forecast ($K_{combined}$) is proportional to the relative strength of its correlation to the Actual CMI ($K_{Actual}$).

One way to combine a number of forecasts is to weight each one according to the strength of its correlation with actual data, and then add them together making no distinction by the internal or external origin of the forecast, as follows:

$$K_{Combined} = \sum_{i=1}^{n} W_i K_i = W_1 K_1 + W_2 K_2 + \ldots + W_i K_n \quad [15]$$

where the sum of the forecast weights is equal to one:

$$\sum_{i=1}^{n} W_i = 1$$

The weight applied to a given forecast $W_i$ is the absolute value of a given forecast's correlation divided by the sum of all forecast correlations, calculated as follows:

$$W_i = \frac{|Corr_i|}{\sum_{j=1}^{m}|Corr_j|} = \frac{|Corr_i|}{|Corr_1|+|Corr_2|+\ldots+|Corr_m|} \quad [16]$$

Figure 5:
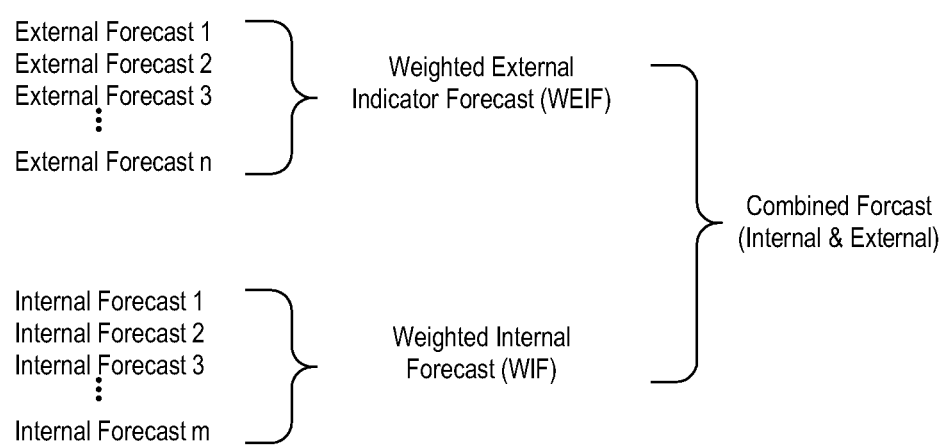
FIG. 5 is a graphic illustration of a strategy to combine forecasts according to the invention.

By example, in a spreadsheet model, it was decided that it would be more useful for purposes of comparison if the forecasts were first combined by origin, i.e. internal or external, and then combined with each other using a similar weighting scheme. Refer to FIG. 5 which shows a graphic illustration of such strategy.

Rather than combine internal and external forecasts at the CMI (K) level, however, in the implementation it was decided to combine internal and external forecasts for a given Line of Business within the demand term for each individual component ($D_c$). Taking this into account, equation 10 now reads as follows:

$$K_{CombinedForecast} \equiv \quad [17]$$

$$\frac{1}{n}\sum_{s=1}^{n} W_s \frac{1}{m_s}\sum_{c=1}^{m_s} W_c \frac{\sum_{l=1}^{b}(W_{WEIF} D_{c_{l_{WEIF}}} + W_{WIF} D_{c_{l_{WIF}}})}{k_c}$$

It should be appreciated that the Weighted External Indicator Forecast (WEIF) for demand and the Weighted Internal Forecast (WIF) demand for a given Component for a given Line of Business can each be composed of a series of weighted external and internal demand forecasts, respectively. Breaking down equation 17 to reflect this, one obtains:

$$K_{CombinedForecast} \equiv \frac{1}{n}\sum_{s=1}^{n} W_s \frac{1}{m_s} \quad [18]$$

$$\sum_{c=1}^{m_s} W_c \frac{\sum_{l=1}^{b}\left(W_{WEIF}\sum_{Ext=1}^{\#Ext_l} W_{Ext} D_{C_{l_{Ext}}} + W_{WIF}\sum_{Int=1}^{\#Int_l} W_{Int} D_{C_{l_{Int}}}\right)}{k_c}$$

where:
Ext and Int are the counters for the External Indicator forecasts and Internal forecasts, respectively; and
Ext$_l$ and #Int$_l$ represent the total number of External Indicator forecasts and Internal forecasts developed for a given Line of Business, respectively.

As such, equation 18 represents, working from the inside out, the weighted combination of the sum of the weighted external forecasts with the sum of the weighted internal forecasts for each Line of Business for each Component, divided by the total capacity of that component, which is then weighted and summed for all Components within a given Service, and finally weighted and summed for all Services.

Finally, we reintroduce the concept of Overhead and Buffer to demand considerations, i.e. rather than either assuming that these demands upon capacity are accounted for within the individual Line of Business demands or that these entities represent the demands of TIG as a separate Line of Business entity. By adding Overhead demand ($D_O$) and Buffer demand ($D_B$) for each component to equation 18, one obtains the following (624):

$$K_{CombinedForecast} \equiv \frac{1}{n}\sum_{s=1}^{n} W_s \frac{1}{m_s} \quad [19]$$

$$\sum_{c=1}^{m_s} W_c \frac{\sum_{l=1}^{b}\left(\begin{array}{c}W_{WEIF}\sum_{Ext=1}^{\#Ext_l} W_{Ext} D_{C_{l_{Ext}}} + \\ W_{WIF}\sum_{Int=1}^{\#Int_l} W_{Int} D_{C_{l_{Int}}}\end{array}\right)}{k_c} + D_{c_O} + D_{c_B}$$

Figure 6A:
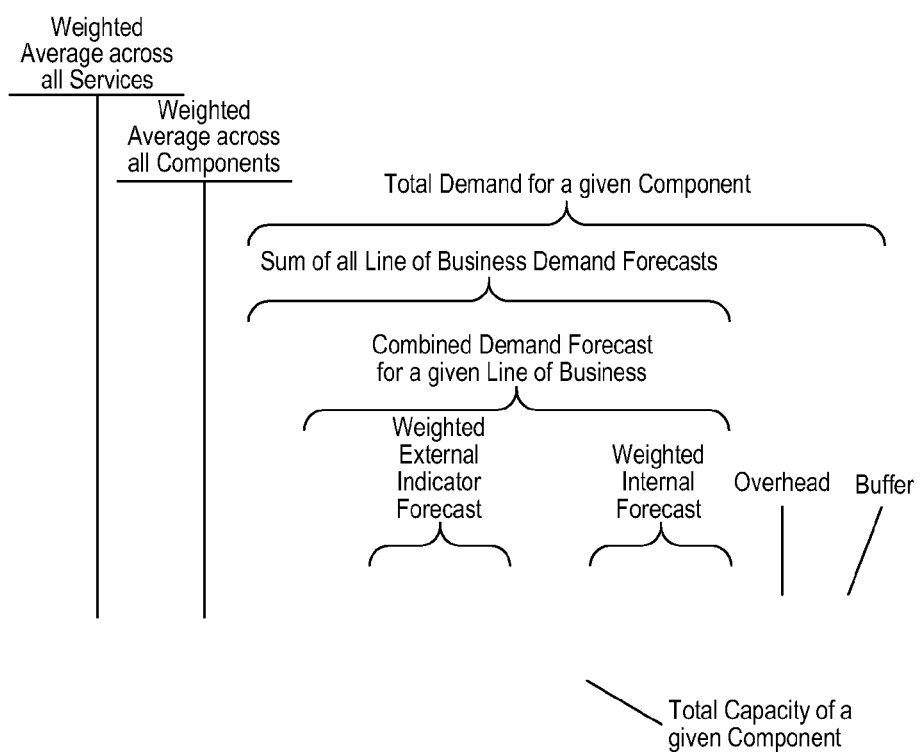
FIG. 6*a* is a schematic diagram identifying the various parts of equation 19 according to the invention.
Figure 6B:
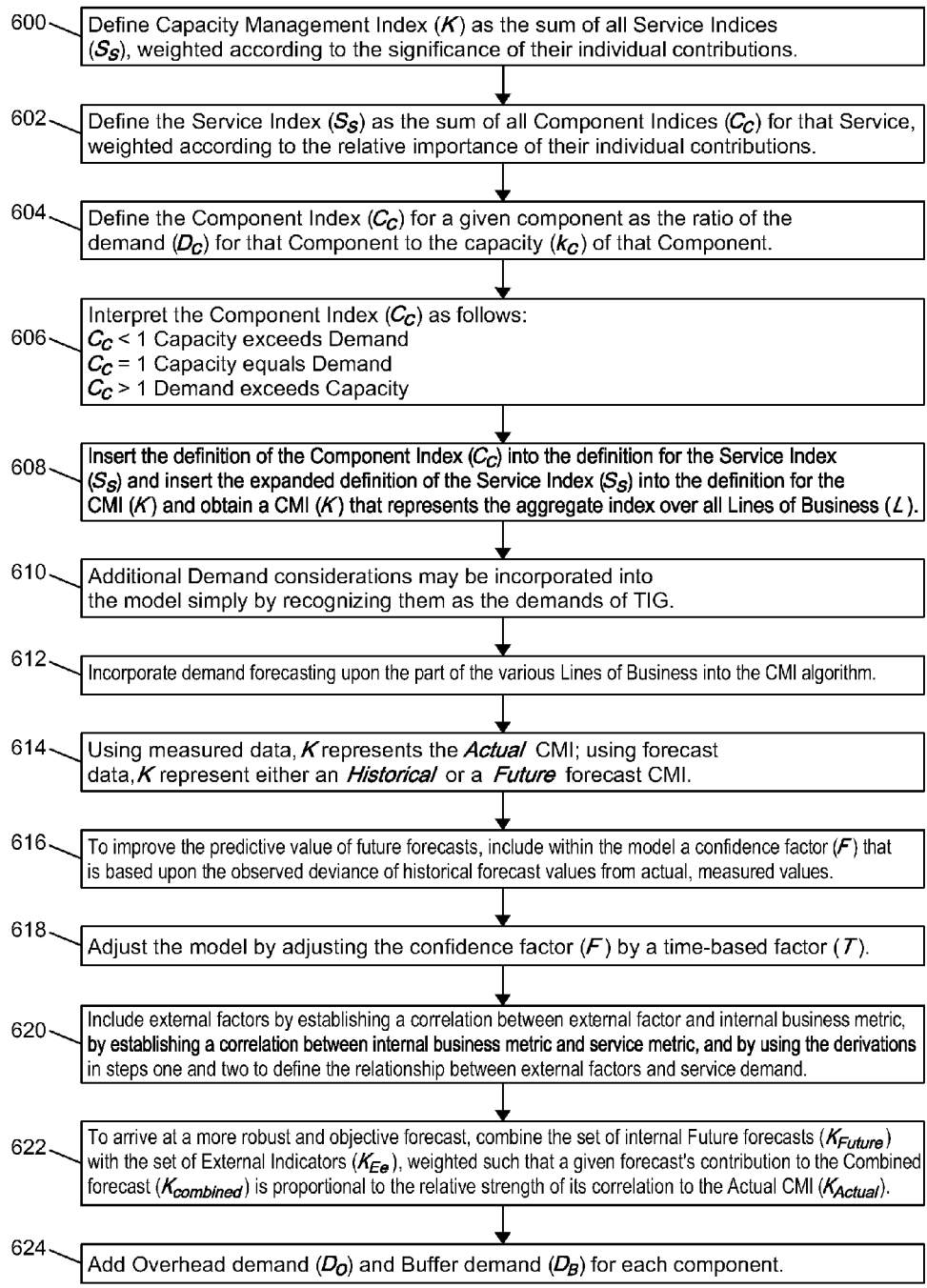
FIG. 6*b* is a schematic flow diagram showing the main steps of an embodiment of the invention.

Thus, to obtain the total demand placed upon a given Component, one first combines the demand forecasts based on External Indicators and Internal business volumes for each Line of Business, then adds up all of the demand forecasts across all Lines of Business, and then adds this sum to the Overhead and Buffer demands for the given Component. Referring to FIG. 6a there is shown a schematic diagram identifying the various parts of equation 19. Or, the Capacity Management Index (K) is defined as the weighted average across all Services of the Weighted average across all Components of the total demand for a given Component divided by the Total Capacity for that component.

Example Expanded Equation

Hereinbelow is an example of an expanded equation for each Component Index, CI. This example shows the LOB demand upon specific components of one of Wells Fargo's infrastructure groups: Hardware Capacity & Storage Management. This equation can be applied to all of the infrastructure groups.

At the highest level, the index can be shown as:

$$CMI = \sum_{1}^{i} W_i CI_i$$
$$= f(D_{lob}, D_{o/h}, D_{bfr}, CC_{tot}, F_{qual})$$
$$f = \langle tbd \rangle$$
$$CI_i = W_i[ComponentDemand/ComponentCapacity]$$
$$= W_i \sum_{1}^{i} SCI_i$$

where:
CMI=Capacity Management Index;
CI=Infrastructure Component Capacity Index;
SCI=Subcomponent Capacity Index;
$W_i$=Weighting factor; and
$F_{qual}$=Qualitative Factors, i.e. management of component, changes to infrastructure, etc.

An expanded equation for each CI (Hardware Capacity and Storage as an example) is as follows:

$$CI_{hc} = W_{hc}[AVERAGE\{[W_{Mainframe\ CPU}(CF_{ISG}(D_{ext}+D_{int})_{ISG}+CF_{WS}(D_{ext}+D_{int})_{WS}+CF_{PCS}(D_{ext}+D_{int})_{PCS}+CF_{MG}(D_{ext}+D_{int})_{MG}+D_{o/h}+D_{bfr})/(CC_{tot})_{Mainframe\ CPU}],$$

$$[W_{Midframe}(CF_{ISG}(D_{ext}+D_{int})_{ISG}+CF_{WS}(D_{ext}+D_{int})_{WS}+CF_{PCS}(D_{ext}+D_{int})_{PCS}+CF_{MG}(D_{ext}+D_{int})_{MG}+D_{o/h}+D_{bfr})/(CC_{tot})_{Midframe}],$$

$$[W_{Dist\ Syst}(CF_{ISG}(D_{ext}+D_{int})_{ISG}+CF_{WS}(D_{ext}+D_{int})_{WS}+CF_{PCS}(D_{ext}+D_{int})_{PCS}+CF_{MG}(D_{ext}+D_{int})_{MG}+D_{o/h}+D_{bfr})/(CC_{tot})_{Dist\ Syst}],$$

$$[W_{Storage}(CF_{ISG}(D_{ext}+D_{int})_{ISG}+CF_{WS}(D_{ext}+D_{int})_{WS}+CF_{PCS}(D_{ext}+D_{int})_{PCS}+CF_{MG}(D_{ext}+D_{int})_{MG}+D_{o/h}+D_{bfr})/(CC_{tot})_{Storage}]\}].$$

For the CMI Proof of Concept—Mainframe CPU Capacity and WFHM expanded is as follows:

$$CI_{MainframeCPU} = W_{hc}[W_{Mainframe\ CPU}(CF_{MG}(D_{ext}+D_{int})_{MG}+D_{o/h}-D_{bfr})/(CC_{tot})_{Mainframe\ CPU}]$$

Modeling Methodology

The Modeling Methodology section describes the basic methodology used to apply the algorithm in an embodiment of the invention. It can be used to expand the CMI to include additional areas and/or example areas, such as by way of example, Lines of Business, TIG Services, and External Factors. It should be appreciated that the particular implementation herein is by way of example only and is not meant to be limiting. Further, it should be appreciated that the description herein is not limited to any specific business entity or Proof of Concept, but is in the context of the development of a Proof of Concept exercise and is not meant to be limiting.

Overview

One of the primary goals of the Proof of Concept for the Capacity Management Index (CMI) is to develop a methodology by which the index can be expanded to include additional Lines of Business and Technology Infrastructure Group (TIG) services. In the present example the index only includes one Line of Business, i.e. Wells Fargo Home Mortgage, one Service, i.e. Hardware Capacity & Storage Management, and one Component (MVS Mainframe CPU) of this Service. The goal of the CMI according to an embodiment of the invention is to cover all Services across all Lines of Business. To do this efficiently, however, it is desirable to have an established methodology for analyzing the disparate parts and then synthesizing this information to arrive at a comprehensive model.

In one embodiment of the invention, the analytical portion of the modeling methodology covers three areas: Services, Lines of Business, and External Factors. Each of these is analyzed to identify its members, break them down into their constituent parts, and then identify characteristics such as sources for actual and forecast data.

The synthesis portion of the modeling methodology takes data and information derived in the analysis portion and brings them together to create a comprehensive forecasting model. This exercise consists of three steps. The first step is to correlate the behavior of External Indicators with the activities of each Line of Business. The second step is to correlate the activities of each Line of Business with demands placed by that business upon Technology Infrastructure Group (TIG) Services. The third step takes the relationships established in the first two steps and uses them to create an end-to-end forecasting model.

Figure 12:
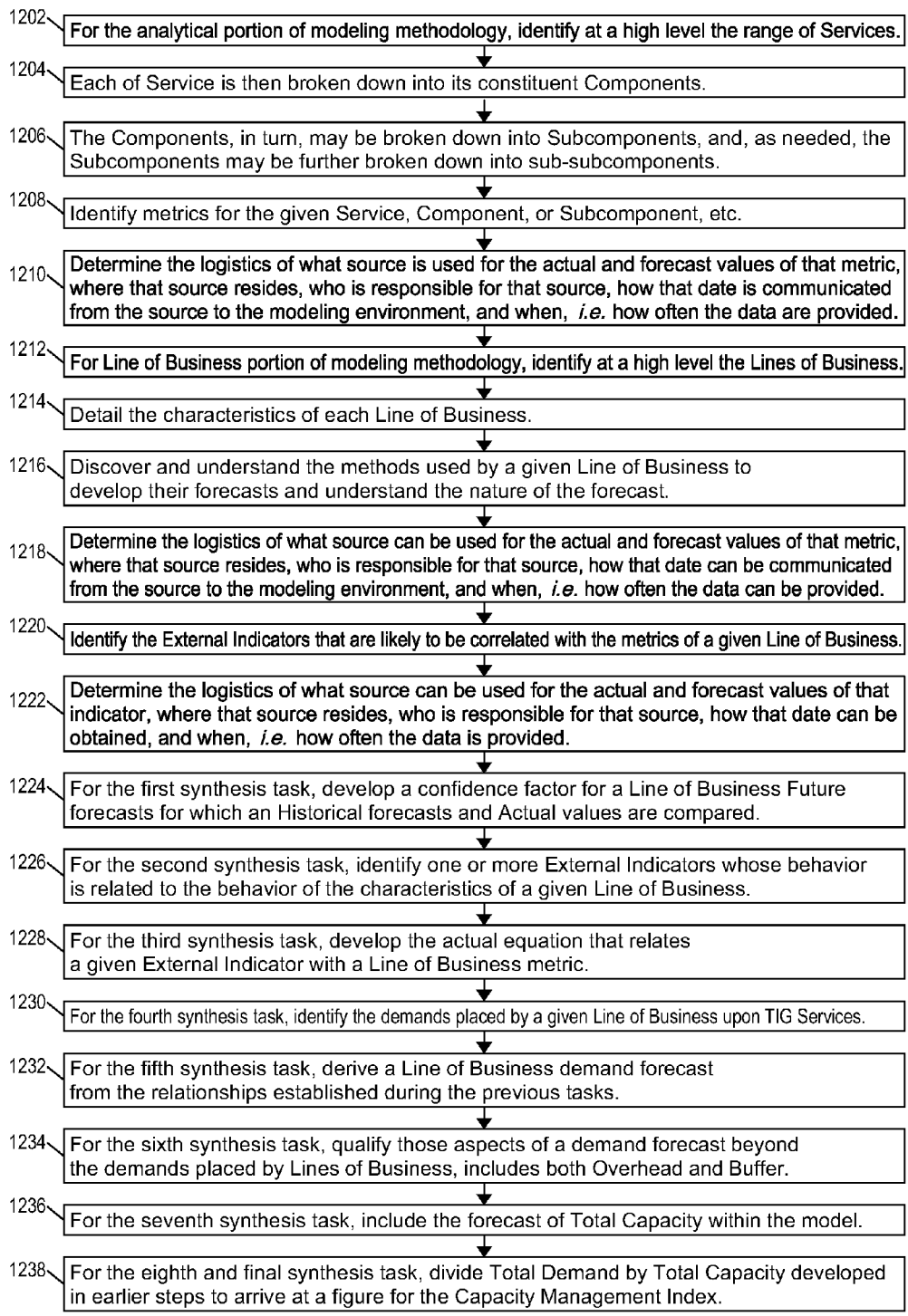
FIG. 12 is a schematic flow diagram showing the main steps of an embodiment of the invention.

Main steps of an embodiment of the invention can be described with reference to FIG. 12, a schematic flow diagram, hereinbelow.

Analysis

This section explains the analytical portion of the modeling methodology as it is applied to Services, Lines of Business, and External Indicators.

Services

By way of example, this section explains the analytical process as applied to Technology Infrastructure Group (TIG) Services.

The first step is to understand the Services the capacities of which one is interested in measuring and forecasting. To begin, one first identifies at a high level the range of services (1202), as follows:
- Network
- Middleware
- Enterprise Messaging
- Hardware Capacity & Storage Each Service is then broken down into its constituent Components (1204). For example, Hardware Capacity & Storage breaks down into the following:
- Mainframe CPU
- Midframe CPU & Storage
- DASD
- Distributed Systems The Components, in turn, may be broken down into Subcomponents (1206). For example, Mainframe CPU consists of the following Subcomponents:
- Hogan
- Sys B
- Sys C
- Cassie Hill Sysplex
- Development
- High Availability (HA)

As needed, the Subcomponents may be further broken down into sub-subcomponents (1206), etc.

The next step is to detail the characteristics of the given Service, going as far down the hierarchy as is desirable to reach a point of comparison. For the Component Mainframe CPU of the Service Hardware Capacity & Storage, for example, this is the concept of Millions of Instructions Per Second (MIPS) provided during peak utilization times, where MIPS is a unit for measuring the processing power of computers.

Once the critical metrics for the given Service, Component, or Subcomponent, etc., are identified (1208), the final step of the analytical process is to determine the logistics of what source is used for the actual and forecast values of that metric, where that source resides, who is responsible for that source, how that data will be communicated from the source to the modeling environment, and when, i.e. how often the data are provided (1210).

Line of Business

This section explains the analytical process as applied to Lines of Business.

The first step is to understand the Lines of Business whose demand one is interested in measuring and forecasting. To begin, one must first identify at a high level the Lines of Business (1212), for example:
- Wells Fargo Home Mortgage (WFHM)
- Wholesale (W)
- Internet Services Group (ISG)
- Private Client Services (PCS)

The next step is to detail the characteristics of each Line of Business (1214). These characteristics should relate to the core of the entity concerned. For example, for Wells Fargo Home Mortgage, appropriate characteristics include the following:
- Dollar volume of business
- Number of employees and contractors
- Unitized products, e.g. dollar amounts of Loan Applications and Loans Funded It is also important to discover and understand the methods used by a given Line of Business to develop their forecasts (1216). For example, it may come to light that a given Line of Business uses an External Indicator such as the Gross Domestic Product (GDP) to derive its forecast. In such a case, it can make sense to include the GDP within the External Indicator analysis. Also, it can be important to understand the nature of the forecast (1216), e.g. is it a straight line extrapolation from actual historical data or is there a more complicated function at work.

Once the critical metrics and other characteristics for a given Line of Business are identified, the final step of the analytical process is to determine the logistics of what source can be used for the actual and forecast values of that metric, where that source resides, who is responsible for that source, how that data can be communicated from the source to the modeling environment, and when, i.e. how often the data can be provided (1218).

External Indicators

This section explains the analytical process as applied to External Indicators.

The first step is to identify the External Indicators that are likely to be correlated with the metrics of a given Line of Business (1220). For example, the following are a few External Indicators that are considered:
- Gross Domestic Product (GDP)
- Unemployment Rate
- Consumer Price Index A sample list of potential External Indicators that can be considered for inclusion within the CMI is provided in the Appendix section hereinbelow.

Once the External Indicators relevant to a given Line of Business are identified, the final step of the analytical process is to determine the logistics of what source can be used for the actual and forecast values of that indicator, where that source resides, who is responsible for that source, how that data can be obtained, and when, i.e. how often, the data is provided (1222).

Synthesis

The following sections explain the synthesis portion of the modeling methodology, which consists of correlating External Indicators with the characteristics of each Line of Business, mapping each Line of Business to the demands placed upon Technology Infrastructure Group (TIG) Services, and then using these established relationships to develop an end-to-end forecasting model.

Develop Confidence Factors for Line of Business Future Forecasts

The first synthesis task is to develop a confidence factor for a Line of Business Future forecasts for which an Historical forecasts and Actual values are compared (1224). This is done by obtaining the Root Mean Square Error (RMSE) and the Correlation Coefficient, as follows:

Find the RMSE for a Line of Business's Historical forecast versus Actual values. The Root Mean Square Error is the square root of the Mean Square Error, which is the average value for the squared difference between each value and the mean:

$$RMSE\sqrt{\frac{1}{n}\sum_{i=1}^{n}(x_i - \hat{x}_i)^2}$$

where $\hat{x}_i$ represents the forecast value of $x_i$.

Find the correlation between a Line of Business's Historical forecast and Actual values.

The RMSE and the correlation coefficient thus obtained can be used to develop a confidence interval for Future forecasts such that one can have some acceptable percentage of certainty, e.g. 95%, that the actual value falls within the specified range.

Correlate External Indicators with Line of Business Metrics

The second synthesis task is to identify one or more External Indicators whose behavior is related to the behavior of the characteristics of a given Line of Business (1226). This exploration requires a number of steps in order to be sure that the relationship established has statistical significance in addition to model relevance, as follows:

Find the correlation between each External Indicator and Line of Business metric.

Select External Indicators for use in model. According to one embodiment of the invention, the criteria used within the Proof of Concept specified that the relationships have a minimum correlation, i.e. negative or positive, of at least 0.75.

The External Indicators chosen in this step are used to develop demand forecasts in the next.

Develop Forecast Equations Based on External Indicators

The third synthesis task is to develop the actual equation that relates a given External Indicator with a Line of Business metric (1228).

Use regression to find the formula that expresses the relationship between a given External Indicator and Line of Business metric. Begin with a straight line relationship, and then move on to other models, e.g. exponential, logarithmic, etc., until a regression equation is found that sufficiently expresses the relationship. According to one embodiment of the invention, the criteria used within the Proof of Concept specified that the regression formula must have an R-squared value of at least 0.80.

Use statistical methods such as hypothesis testing to verify the relationship and the validity of its use within a predictive model.

Develop weights for a given External Indicator demand forecast equation by comparing its correlation coefficient with that of the other External Indicator demand forecast equations, as follows:

$$W_i = \frac{|Corr_i|}{\sum_{j=1}^{n}|Corr_j|} = \frac{|Corr_i|}{|Corr_1| + |Corr_2| + \ldots + |Corr_n|}$$

At this point, a set of weighted equations that represent demand forecasts that are based upon External Indicators are obtained.

Map Lines of Business to Demand

The fourth synthesis task is to identify the demands placed by a given Line of Business upon TIG Services (1230). This exploration can include a number of steps to aid in ensuring that the relationship established has statistical significance in addition to model relevance, as follows:

Identify the product supply chain for a given Line of Business.

Identify which TIG Services, Components, Subcomponents, etc., are used by which products.

Establish the demand placed upon Service, Components, Subcomponents, etc by the Line of Business products.

Analyze data to discover the usage pattern for each established demand.

Quantify the general relationship between Line of Business products and TIG Services, i.e. how much of a given Service is used per Line of Business unitized product.

Develop the equations that describe the relationship between Line of Business products and TIG Services.

The above steps may need to be modified, depending upon the specific Lines of Business and TIG Services being considered.

Derive Line of Business Demand Forecast

The fifth synthesis task is to derive a Line of Business demand forecast from the relationships established during the previous tasks (1232).

Combine External Indicator demand forecasts using weights based upon correlation between External Indicator and actual Line of Business metrics to obtain a Weighted External Indicator Forecast (WEIF) of demand of a given Line of Business for a given TIG Service.

Combine Internal demand forecasts using weights based upon correlation between forecast and actual values of Line of Business metrics to obtain a Weighted Internal Forecast (WIF) of demand of a given line of Business for a given TIG Services.

Combine WEIF and WIF demand forecasts using weights based upon the average of the respective correlations of the various component equations. This yields an overall weighted forecast for the demand placed by a given Line of Business upon a given Service.

Quantify Overhead and Buffer Demand

The sixth synthesis task is to quantify those aspects of a demand forecast beyond the demands placed by Lines of Business (1234). This includes both Overhead and Buffer.

Overhead is that portion of demand upon a Service's capacity that cannot be uniquely assigned to a specific Line of Business, but rather is required for the operation of that Service. For example, in a computing resource, this might be processing power devoted to running the operating system.

Buffer is an allotted capacity beyond expected demand, set aside in order to accommodate sudden, unanticipated spikes in demand. This is a policy-based number, for example, one Service might choose to allocate 20% of total capacity as a buffer.

After adding Overhead and Buffer to the Line of Business Demand Forecast(s) results in a total figure for the numerator of the CMI ratio according to one embodiment of the invention.

Include Total Capacity Forecast

The seventh synthesis task is to include the forecast of Total Capacity within the model (1236). This can be somewhat different for each Service. If no forecast is available, then static values representing current capacity may be used to see how the CMI is affected by future demand holding capacity constant.

Calculate Capacity Management Index (CMI)

The eighth and final synthesis task is to divide Total Demand by Total Capacity developed in earlier steps to arrive at a figure for the Capacity Management Index (1238):

$$\text{Capacity Management Index} = \frac{\text{Demand} + \text{Overhead} + \text{Buffer}}{\text{Total Capacity}}$$

Example Correlation Derivations and Trends

Figure 7:
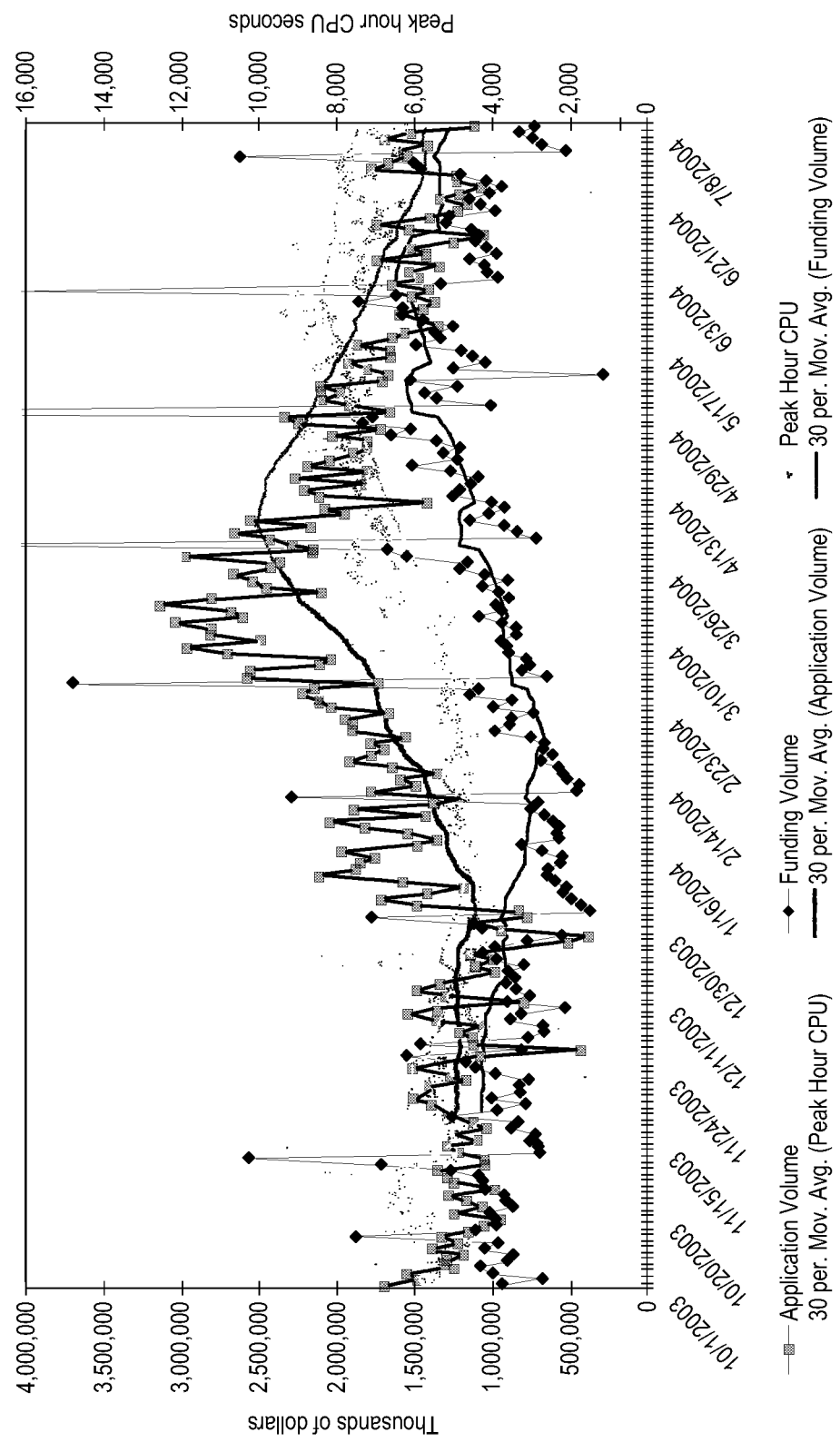
FIG. 7 is a graph showing an example of data trending according to the invention.

FIG. 7 is a graph showing an example of data trending. Specifically, the graph represents a way of looking at correlations and how External indicators can be chosen. Over time in units of months, a Line of Business's application volume, funding volume, and peak per hour CPU consumption are plotted according to thousands of dollars received and peak hour CPU seconds.

Figure 8:
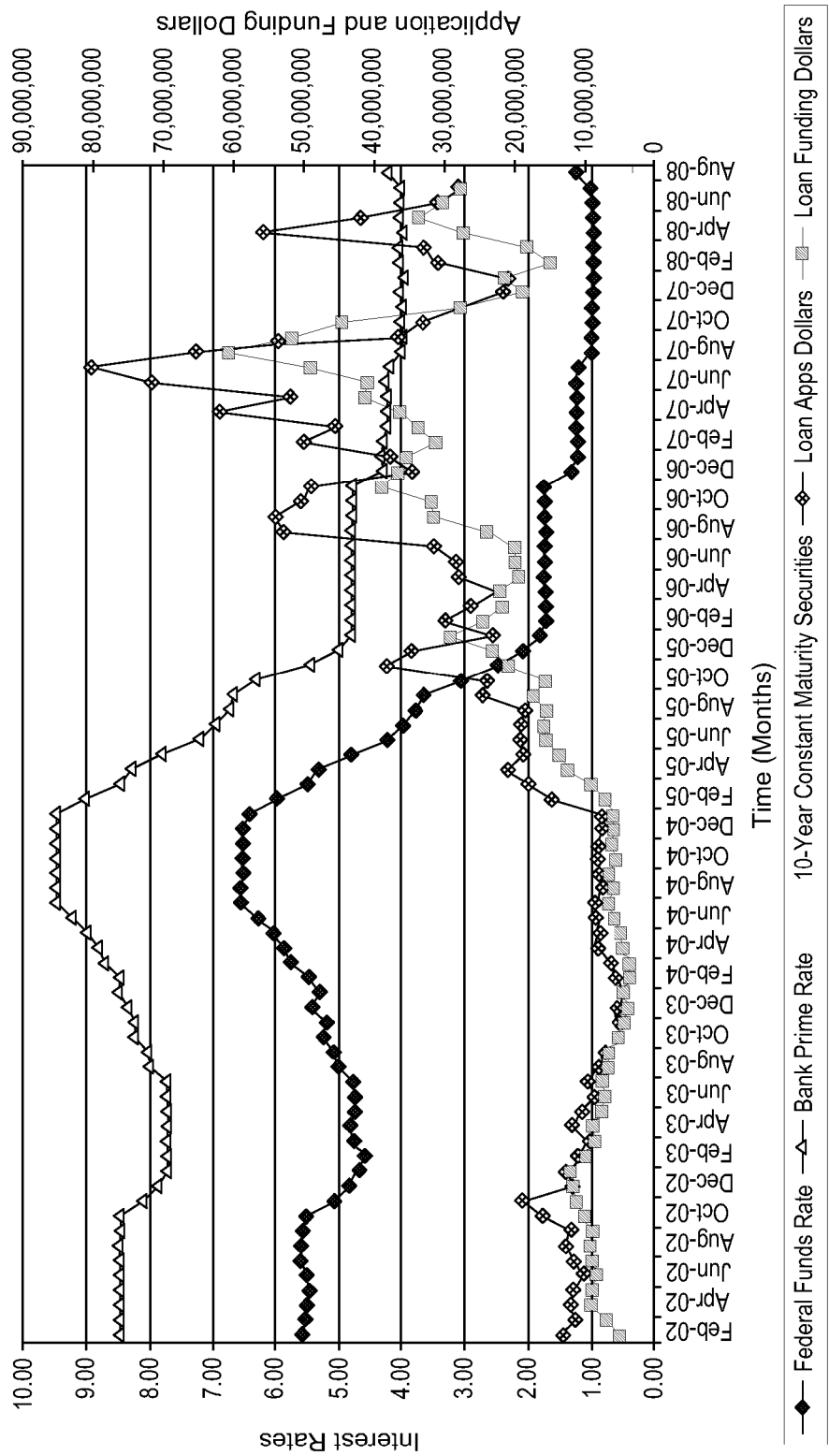
FIG. 8 is a graph showing an example of trending and external indicators with interest rates and loan application and funding dollars over time according to the invention.

FIG. 8 is a graph showing an example of trending and external indicators with business volume data. Specifically, the graph shows interest rates and loan application and funding dollars over time.

Figure 9:
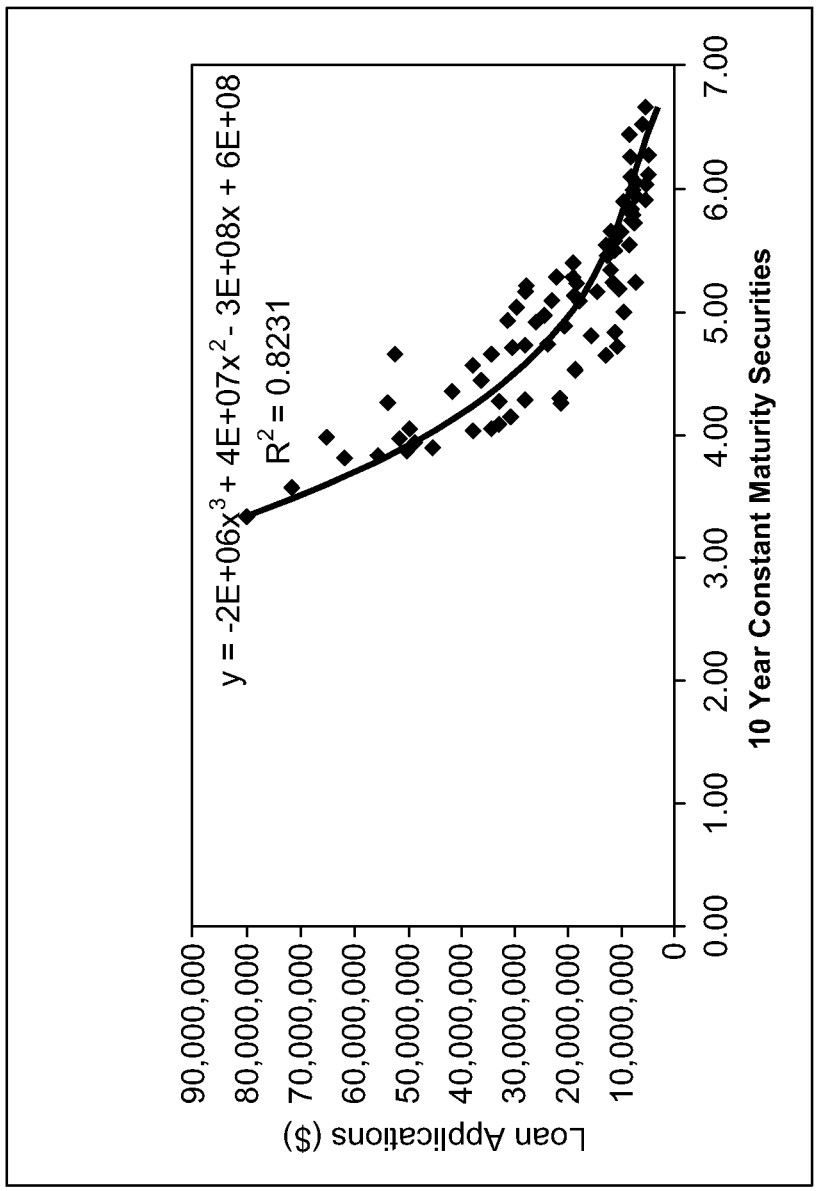
FIG. 9 is a graph showing an expected correlation from 10 years constant maturity securities against loan applications according to the invention.

FIG. 9 is a graph showing an expected correlation from an example study. Specifically, the graphs shows 10 years constant maturity securities against loan applications. In this example, the correlation coefficient is −0.856.

Figure 10:
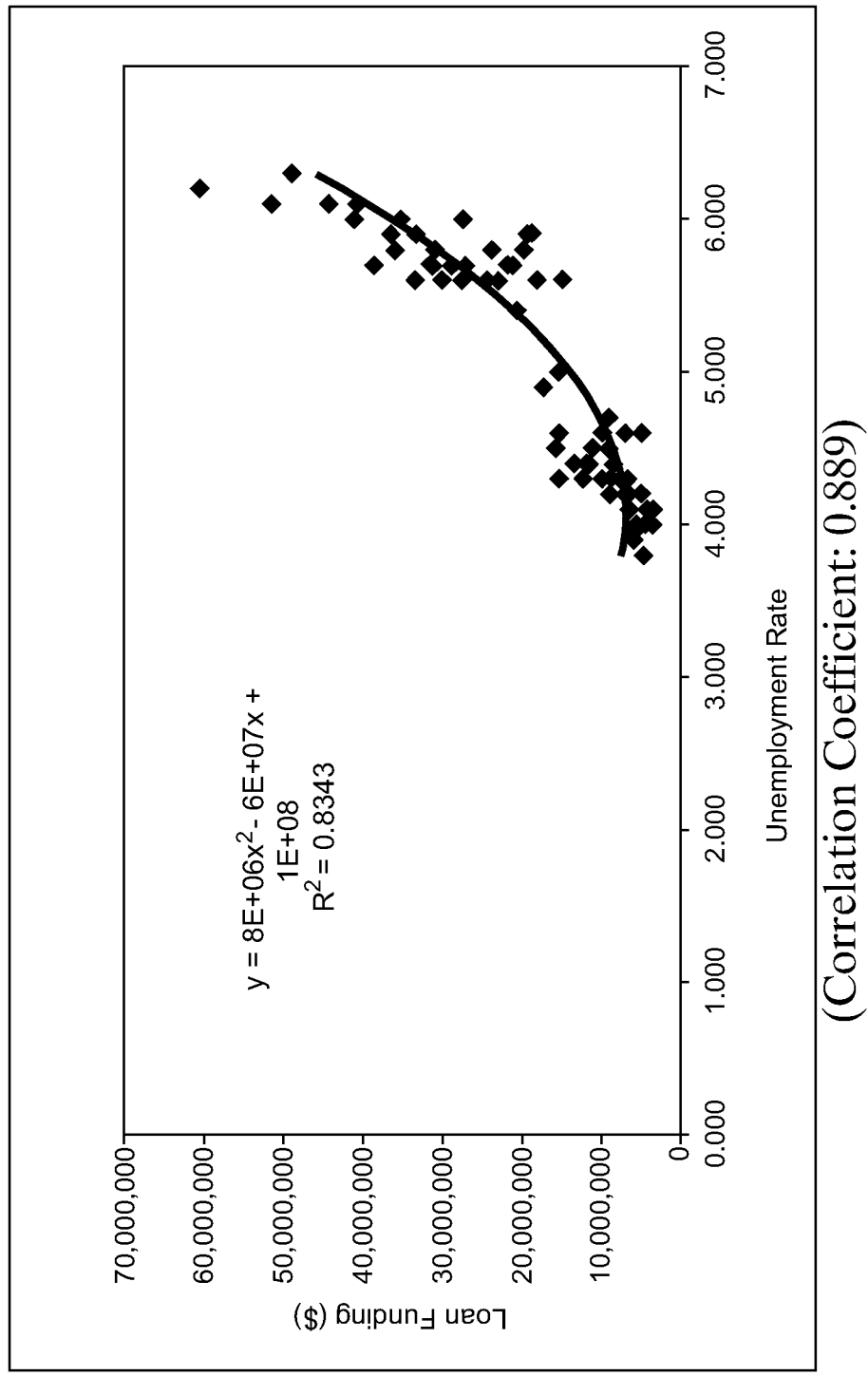
FIG. 10 is a graph showing an unexpected correlation from unemployment rate against loan funding according to the invention.

FIG. 10 is a graph showing an unexpected correlation from an example study. Specifically, the graphs shows unemployment rate against loan funding. In this example, the correlation coefficient is 0.889.

Figure 11:
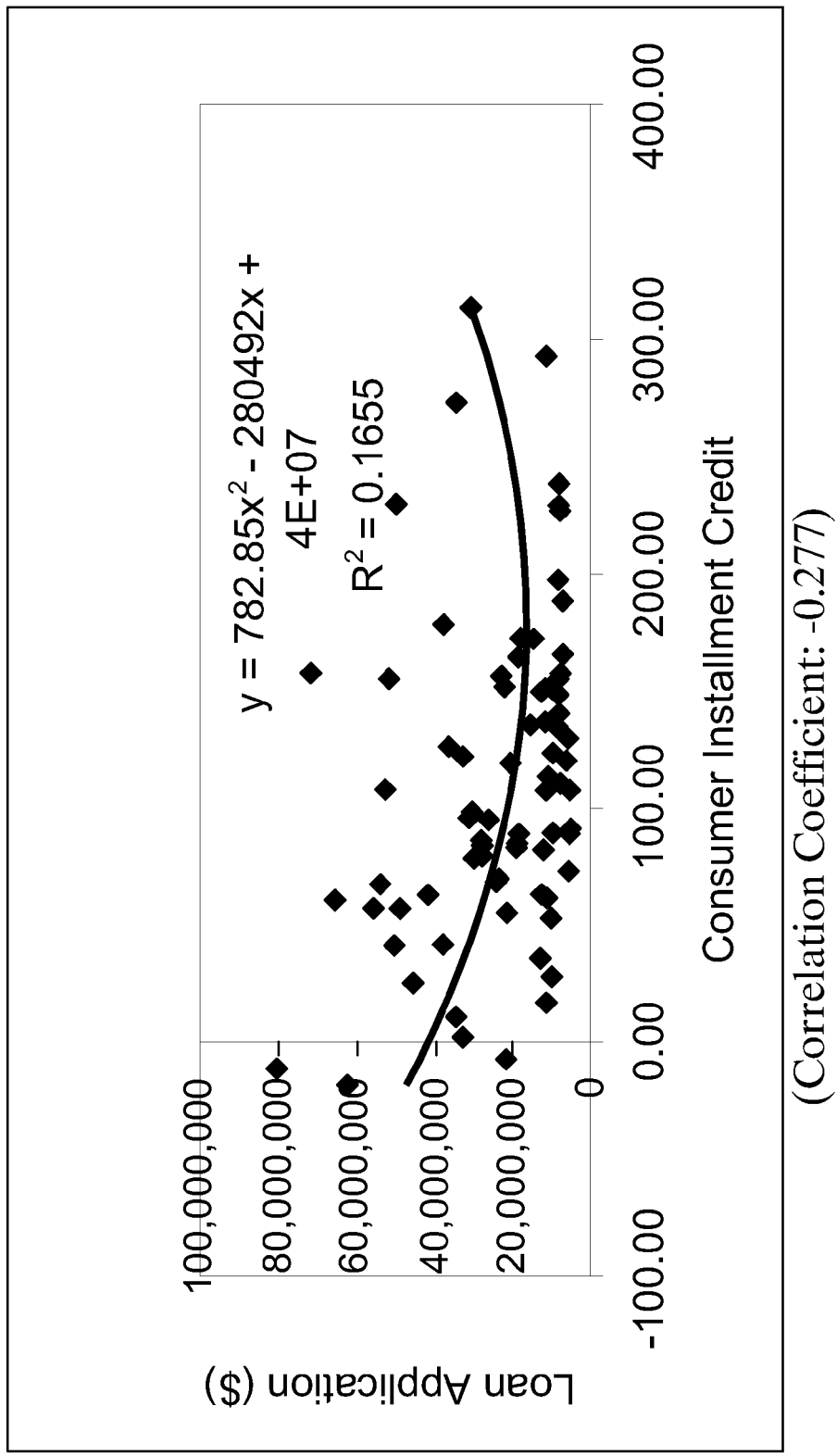
FIG. 11 is a graph showing no correlation from consumer installment credit against loan application according to the invention.

FIG. 11 is a graph showing no correlation from an example study. Specifically, the graphs shows consumer installment credit against loan application. In this example, the correlation coefficient is −0.277.

An Example Implementation of an Embodiment of the Invention

The section provides the specific results obtained during a limited scope of a Proof of Concept example implementation of an embodiment of the invention. The analysis of these results, issues encountered in the development of the model, and general conclusions about the model are discussed hereinbelow. In particular, the following sections discuss a spreadsheet model developed during the Proof of Concept, including:

Scope of the spreadsheet model in terms of Lines of Business and infrastructure Services;

Facts regarding various aspects of the spreadsheet model;

Assumptions made to demonstrate the function of the spreadsheet model;

Results obtained with the spreadsheet model;

Analysis of the results obtained with the spreadsheet model;

Issues encountered in developing the spreadsheet model; and

Conclusions drawn about the spreadsheet model.

Scope

This section defines the scope of a spreadsheet model developed within the Proof of Concept.

The Proof of Concept focused only upon a single Line of Business, Wells Fargo Home Mortgage, and in particular concentrated upon Loan Applications and Loan Funding with regard to business metrics. Furthermore, the Proof of Concept only examined a single Service, Hardware Capacity and Storage, and in particular concentrated upon a specific mainframe application.

The model yields business demand and CMI values based on the MR application usage. All other Line of Business demands upon the MVS environment are aggregated into a separate demand term, i.e. Other LoB Demand.

Facts

The following facts relate to the spreadsheet model developed within the Proof of Concept:

Forecast demand values prior to August 2004 are actual values obtained from a Hardware Capacity metrics reporting group.

On a Service Demand Forecast tab, total utilization prior to August 2004 represents actual data obtained from a Hardware Capacity metrics reporting group.

Actual Mainframe demand and Mainframe capacity data for September 2004 onward was not available at the time of writing.

Assumptions

This section lists the assumptions made during the development of the spreadsheet model within the Proof of Concept.

The following assumptions were made in development of the Proof of Concept spreadsheet model for the Capacity Management Index:

Overhead is assumed to be accounted for within the demand assigned to Other Lines of Business.

Buffer demand represents 22% of total capacity.

Total Line of Business demand from September 2004 onwards is estimated by obtaining the ratio of Line of Business demand to capacity for the same month in the prior year, and then applying this ratio to the forecast for total capacity.

Demand attributed to Other Lines of Business for months prior to September 2004 is estimated as total Line of Business demand less WFHM demand for that month.

Demand attributed to Other Lines of Business from September 2004 onwards is estimated by obtaining the ratio of Other Line of Business demand to total Line of Business demand for the same month in the prior year, and then applying this ratio to the forecast for total Line of Business demand.

Capacity forecasts for 2005 are estimated by obtaining the percent monthly change in capacity for the months in 2004 and then applying the same change month by month in 2005.

2005 External Indicator forecast assumptions are presented in the Table A, as follows:

TABLE A

| | External Indicator Forecasts (%) | | | | | | | | | | | |
|---|---|---|---|---|---|---|---|---|---|---|---|---|
| | January | February | March | April | May | June | July | August | September | October | November | Decemeber |
| 10-year Constant Maturity Securities | 5.00 | 5.00 | 5.00 | 5.00 | 5.00 | 5.00 | 6.00 | 6.00 | 7.00 | 7.00 | 7.00 | 7.00 |
| Unemployment Rate | 6.00 | 6.00 | 5.00 | 5.00 | 4.00 | 4.00 | 3.00 | 3.00 | 3.00 | 3.00 | 3.00 | 3.00 |

Results

The forecast CMI results obtained from the spreadsheet model developed within the Proof of Concept are summarized in Table B, as follows:

TABLE B

| | Demand on MVS (CPU Seconds) | | | | |
|---|---|---|---|---|---|
| | 4Q04 | 1Q05 | 2Q05 | 3Q05 | 4Q05 |
| WFHM Demand | 6,497 | 6,135 | 5,931 | 5,617 | 5,440 |
| Other LoB Demand | 65,905 | 63,955 | 67,021 | 88,137 | 83,278 |
| Overhead Demand | 0 | 0 | 0 | 0 | 0 |
| Buffer Demand | 26,583 | 27,219 | 29,202 | 31,329 | 33,611 |
| Total Demand | 98,985 | 97,309 | 102,154 | 125,084 | 122,329 |
| Total Capacity | 120,834 | 123,722 | 132,735 | 142,405 | 152,778 |
| CMI | 0.82 | 0.79 | 0.77 | 0.88 | 0.80 |

These quarterly results were obtained by averaging the monthly data for each quarter.

The various rows of Table B are explained as follows:

WFHM Demand This is the average daily demand placed on the MVS system by the Wells Fargo Home Mortgage line of business to fund home loans using the MR application. These are forecast volumes of CPU seconds during peak usage, obtained using the correlation with external indicators and the line of business forecast. Daily figures were averaged to obtain monthly figures, and then the monthly figures were averaged to obtain quarterly figures.

Other LoB Demand This is the remainder of Line of Business demand upon the MVS system. As with WFHM Demand, daily figures were averaged to obtain monthly figures, and then the monthly figures were averaged to obtain quarterly figures. It is assumed for the purpose of the spreadsheet model that Other Lob Demand includes Overhead demand.

Overhead Demand Because the hardware capacity group does not report on technical overhead demand, it was decided to include Overhead within the figures for Other LoB Demand.

Buffer Demand The capacity reserved as a Safety Buffer is calculated as a constant 22% of the Total Capacity.

Total Demand This is the sum of the above demand figures.

Total Capacity This is the total forecast capacity of the MVS system.

CMI This is the Capacity Management Index (K) forecast for the MVS mainframe environment.

It should be appreciated that the figures presented in Table B not be taken as a true CMI, even considering the limited scope specified hereinabove. Due to the various assumptions made to calculate the WFHM Line of Business forecast demand, as well as with regard to assumptions made for the Other LoB and Total Capacity, these figures bear a strong resemblance to those for 2004. The key here is that a legitimate framework has been developed. Using this framework, along with real LoB and capacity forecast data, a more informative CMI may be obtained.

Analysis

The following sections provide a foundation of basic interpretation of the CMI, insight into the meaning of observed trends, and an analysis of the results obtained with the CMI Proof of Concept spreadsheet model hereinabove.

Foundation

This section provides a foundation of basic interpretation of the CMI.

Proper interpretation of the results requires a foundation in the basic implications of the CMI. Because the algorithm takes into account all demand terms, including demand terms related to Overhead, Buffer, etc. the optimum index is 1.00 for all cases. At a CMI level of 1.00, total capacity is sufficient to meet the demands placed by Lines of Business plus the demands placed by system Overhead requirements and still reserve a safety Buffer to cover unanticipated spikes in utilization.

With the optimum value of 1.00 for the CMI, the following three possible scenarios are presented as follows:
K>1
K=1
K<1

Each of these scenarios is discussed in turn:

K>1 When K>1, demand exceeds capacity. To bring the system into balance, either more capacity is to be added, or else demand is to be reduced. The latter does not necessarily mean a decrease in demand upon the part of Lines of Business. Instead, this may mean that the infrastructure Service may opt for a decreased Buffer specification. Where the Buffer allotment was excessive, reducing the Buffer may make sense. Reducing the Buffer where the Buffer allotment is already reasonable, however, represents an increased risk to the organization of encountering performance issues or a experiencing a denial of demands placed upon a Service during peak periods.

K=1 When K=1, demand equals capacity. This is the desired result as it means that capacity is meeting, or is expected to meet, demand. It should be appreciated that this does not mean that capacity is maxed out or that there is no room for spikes in utilization, as the demand quantity in the numerator specifically includes a Buffer for this purpose.

K<1 When K<1, capacity exceeds demand. This is a safe position to be in but also shows that capacity may be managed more efficiently. If the organization wants to have that kind of extra capacity on reserve, then this should be explicitly included within the Buffer demand term, which would restore balance to the equation. If the organization does not want to have that kind of extra capacity on reserve, then a possible step would be to reduce capacity.

Trending

This section provides insight into the meaning of observed trends.

Trending of the CMI and its various Service and Component indices allow insight into how demand vs. capacity picture changes over time. There are essentially three scenarios for how K may change over time, as follows:

K is increasing over time
K remains constant over time
K is decreasing over time Each of these scenarios is discussed in turn:

K Increases If K increases over time, this means that demand is increasing with respect to capacity or the somewhat less likely scenario that capacity is decreasing with respect to demand. This may be the desired result. For example, a given Service may be gradually increasing the Buffer term in order to bring the CMI up to the optimal value of 1.00. However, it also may reveal that capacity is falling behind.

K Constant If K is unchanging over time this means that capacity is keeping up with demand. This could represent either a static situation, in which neither capacity nor demand is changing, or it could represent a dynamic situation, in which both capacity and demand are changing, but in proportion to one another. Also, while a static value of K hovering near the optimal value of 1.00 is desirable, a static value of K that is too far above or below 1.00 is not, as is discussed in the previous section.

K Decreases If K decreases over time, this means either demand is shrinking with respect to capacity, or that capacity is growing faster than demand is growing. It could be that there is no longer as much demand for a particular Service, for example due to a swing in the business cycle, or it could be that a Service has expanded its capacity too much or too quickly and may need to slow down its expansion in order to let the demand catch up. In either case, the organization needs to examine the business need for the capacity.

Analysis of Results

This section provides an analysis of the CMI results obtained within the Proof of Concept.

An analysis of the results obtained within the CMI Proof of Concept shows the following:

The monthly CMI exceeds 1.0 on only two occasions in the 24 months of the test period, each time reaching a value of 1.01, just 1% above the optimum.

The quarterly CMI as shown in Table B never exceeds 0.90 for the test period.

These two findings may lead one to conclude that the capacity for this component is being managed efficiently because a monthly CMI may reach or exceed by a small amount the optimum value, while the quarterly CMI does not exceed the optimum value. Taking a quarterly average provides a smoothing effect upon the CMI, which mutes the variance and allows one to observe the general trend.

If these results were based upon actual historical data and real Line of Business and Service capacity forecasts, the CMI would show that this particular mainframe environment can be expected to meet the demands that can be placed upon it every month over the remainder of this year and through the next. If capacity buffers are soft and able to be used to handle spikes in utilization, then no increases to capacity may be necessary.

Conclusions

This section summarizes conclusions about the model drawn from the Proof of Concept.

Optimum Value for CMI is 1.00

As discussed previously, the CMI equals demand divided by capacity. Therefore, when demand exactly equals capacity the CMI has a value of 1.00. Because possible demand terms have been identified, i.e. Line of Business+Overhead+Buffer, it follows that the CMI is optimized when demand equals capacity, which yields a CMI value of 1.00.

Smoothing Recommended for Trend Analysis

Results of the model are reported on monthly, quarterly, and six-month moving average bases. It can be desirable to use all of these reports to gain a comprehensive view of the demand/capacity picture. The monthly report shows that there may be a significant range of index values from month to month, while the six month moving average shows the average CMI trend with a much smaller range of values. The quarterly report is particularly useful in that it corresponds to the periodicity of existing reporting mechanisms. Accordingly, it may be used in the context of strategic planning performed on a quarterly basis.

Model Allows Scenario Planning

There are various ways to approach scenario planning in terms of the External Indicators used for the model. The algorithm and methodology developed may be integrated with a variety of statistical risk analysis techniques, e.g. Monte Carlo simulation, to asses the potential impact of economic shifts upon the ability of the infrastructure to meet the demands upon its capacity.

Methodology Results Consistent with Stated Goals

This model shows that the final operational product can produce results that facilitate the making of strategic decisions regarding the management of capacity of selected Services and their Components. These results are based in part on demand forecasts given by the Lines of Business adjusted for historical accuracy and in part on predictions resulting from correlations with factors external to the Bank.

The methodology used for demand forecasting based upon the correlation between business volume and External Indicators may be used to help Lines of Business improve the accuracy of their business volume forecasting.

Nested CMI Indices Enable Drill Down

Taken alone, the specific number obtained for the aggregate CMI may be insufficient as a management tool. A strength of the CMI lays in its inherent ability to decompose, revealing within the various indices of its constituent parts.

The overall CMI is the weighted average of the various Service indices, which in turn are the weighted averages of their constituent Component indices, etc. The total CMI thus obtained is a number that can show that the ability of the infrastructure as a whole to meet the demands placed upon it and how this ability changes or fails to change over time.

While this is useful as a start, it is by no means an end. The next level of indices, i.e. representing the ability of each Service to meet the demands upon it, is preferably available for analysis. Similarly, each Service index is preferably able to be broken down to reveal the underlying indices for each of its Components. Likewise, this process may be continued through Subcomponents, Sub-subcomponents, etc.

Managers at each level of responsibility require a different level of detail with regard to the information necessary to effectively manage the systems under his or her authority. These various levels of detail result in a nested set of indices, into which one can successively drill to find further explanation of what a given index means.

Appendices

The Appendices offer a sample list of External Indicators that can be considered for use within the CMI, as well as a guide to key aspects of the example spreadsheet model developed within the example Proof of Concept according to an embodiment of the invention.
Assessment Management Database
An Assessment Management Database is a finance initiative that builds an inventory of components and aspects about them such as age, cost, rated capacity, etc. The CMI can rely on input from this database for the capacity related aspects of the index.
Spreadsheet Guide
The following sections document the basic form and function of the Capacity Management Index (CMI) spreadsheet.
System Requirements
This section describes the system requirements for the Capacity Management Index (CMI) spreadsheet.
Operating System: Windows 200, Windows XP
Spreadsheet: Microsoft Excel 2000, Microsoft Excel XP
Add-ons: Analysis Tool Pack
Tab Descriptions
This section describes the function of the various worksheets tabs within the CMI spreadsheet.
  The CMI spreadsheet comprises the following tabs:
  Mainframe CMI—This sheet performs the final calculations that derived an actual and a forecast CMI value for the following:
    Service: Hardware Storage & Capacity Service
    Component: Mainframe
  The spreadsheet is structured so that the columns correspond to months and the rows correspond to the various actual and forecast values for a given month. The rows are grouped into actual and forecast sections.
  A column labeled "Equation Description/General Formula" contains a brief description of from where the data in that particular row comes. For example, WFHM Demand, Actual data comes from the WFHM section of the "Service Demand Actuals" tab, while the Buffer, Actual data is calculated as 20% of the corresponding Total Capacity.
  CMI Monthly Chart—This chart presents the monthly forecast CMI from January 2004 through December 2005, along with a six-month rolling average line that smoothes out the variance of the monthly indices.
  CMI Quarterly Chart—This chart presents the quarterly forecast CMI from January 2004 through December 2005. The quarterly data is derived by taking the average of the monthly figures for each quarter.
  Demand Models—This sheet is the engine for modeling the demand of a single Line of Business: Wells Fargo Home Mortgage. The spreadsheet is structured so that the columns correspond to months and the rows correspond to the various actual and forecast values for a given month. The rows are grouped into the following sections:
    Actual Values—This section contains actual values for Loan Application ($), Loan Funding ($), and Mainframe CPU Seconds (#).
    External Indicator Forecasts—This section contains demand forecast values based upon External Indicators such as the 10 yr Constant Maturity Securities and the Unemployment Rate. These predictions are weighted and then combined to derive the Weighted External Indicator Forecast (WEIF).
    Internal Business Forecast—This section contains demand forecast values based on business volume predictions made by the Line of Business. These predictions are weighted and then combined to derive the Weighted Internal Forecast (WIF).
    Combined Weighted Forecast (Internal & External)—This section combines the Weighted External Indicator Forecast (WEIF) and the Weighted Internal Forecast (WIF), each weighted according to their predictive value.
  Demand Chart—This chart provides an illustrated comparison of actual and forecast demand values for the MVS Mainframe Component of the Hardware Storage & Capacity Service for the Wells Fargo Home Mortgage (WFHM) Line of Business.
  Forecast Accuracy Chart—This chart provides an illustrated comparison of the accuracies of the Weighted External Indicator Forecast (WEIF), the Weighted Internal Forecast (WIF), and the Combined Forecast (CF), as calculated by using the Root Mean Square Error (RMSE) method.
  Service Demand Actuals—This sheet provides a data repository for actual, i.e. measured, values of Service demand. It also contains a conversion from MIPS to CPU Seconds, as follows:
  CPU=3.6 MIPS
  Service Demand Forecast—This sheet provides a data repository for Line of Business forecast values of service demand. As actual forecast data was not available for all time periods, dummy values were provided for those periods missing data, the formulas for which are documented within the spreadsheet.
  Service Capacity Actuals—This sheet provides a data repository for actual, i.e. measured, values of service capacity. It also contains a conversion from MIPS to CPU Seconds, as follows:
  CPU=3.6 MIPS
  Service Capacity Forecast—This sheet provides a data repository for forecast values of service capacity. It also contains a conversion from MIPS to CPU Seconds, as follows:
  CPU=3.6 MIPS
  LOB Actuals—This sheet provides a data repository for actual, i.e. measured, values of Line of Business volumes, i.e. business metrics.
  LOB Forecast—This sheet provides a data repository for forecast values of Line of Business volumes, i.e. business metrics. It should be appreciated that the data on the LOB Forecast sheet up to and including June 2004 are not real historical forecast values. Instead, they are dummy historical forecasts used as placeholders for real data while building the model. The data from July 2004 on, however, represents real forecast values provided by the Line of Business.
  EI Info—This sheet provides an overview of the attributes of the External Indicators considered in the Proof of Concept modeling effort. Attributes include description, data source, URL of source, frequency of data, and geographic focus of data. External Indicator data was acquired from Economy.com, Inc. The following lists shows example External Indicators that were considered for inclusion in the Capacity Management Index during the Proof of Concept:

Gross Domestic Product (GDP);
Gross National Product (GNP);
Per Capita Disposable Personal Income;
Personal Saving Rate;
Unemployment Rate;
Consumer Price Index;
Consumer Confidence Index;
Consumer Installment Credit;
Household Debt Service Ratio;
Federal Funds Rate;
3-Month T-Bill Auction Average;
Bank Prime Rate;
10-Year Constant Maturity Securities;
10-year Treasury bonds less fed. Funds;
1-Month US Dollar Deposits;
3-Month US Dollar Deposits;
6-Month US Dollar Deposits; and
1-Year US Dollar Deposits.

EI Quarterly—This sheet provides a data repository for quarterly External Indicator data.

EI Monthly—This sheet provides a data repository for monthly External Indicator data.

EI Correlations—This sheet provides the correlations between External Indicators and actual Line of Business volume metrics.

DUMMY LOB Forecast—This sheet provides the calculation of dummy forecast values for the Line of Business volume metrics for the period of time between January 1989 and July 2004, for which real historical forecast values were not available. It should be appreciated that the final values used are labeled, Frozen, as the formulas used may alter the dummy values with each recalculation of the spreadsheet.

DUMMY LOB Forecast Chart—This sheet provides an illustrated comparison of the dummy forecast and the actual values of the business volume metrics. It was used during the derivation of the dummy forecast values to get an idea of how close or far away they were from the actual values upon which they were based. The dummy forecast changes with each recalculation of the spreadsheet.

Formula Definitions

This section defines the more complicated formulas used within the Demand Models tab of CMI model spreadsheet.

External Forecast: Loan Application Demand (y) Based on 10-Yr Interest Rate (x)

Loan Apps: $y=-9.6\times10^5 x^3 + 2.2\times10^7 x^2 - 1.7\times10^8 x + 4.2\times10^8$ CPU Secs: 3207+2225*avg daily loan applications+ 2652*calcmethodi External Forecast: Loan Funding Demand (y) Based on 10-Yr Interest Rate (x)

Loan Funding: $y=-5.0\times10^5 x^3 + 1.2\times10^7 x^2 - 9.7\times10^7 x + 2.6\times10^8$ CPU Secs: 3207+2225*avg daily loan funding+ 2652*calcmethod External Forecast Loan Funding Demand (y) Based on Unemployment Rate (x)

Loan Funding: $y=8.0\times10^8 x^2 - 6\times10^7 x + 1.0\times10^8$

CPU Secs: 3207+2225*avg daily loan funding+ 2652*calcmethod

Calculation of Weights for Equations based on External Indicators

Let n, m be the number of equations to be weighted.

$$W_i = \frac{|Corr_i|}{\sum_{j=1}^{m}|Corr_j|} = \frac{|Corr_i|}{|Corr_1|+|Corr_2|+\ldots+|Corr_m|}$$

This method means that the sum of weights is equal to one, i.e.

$$\sum_{i=1}^{n} W_i = 1$$

Corr$_1$=CORREL(10-yr Constant Maturity Securities Interest Rate, Loan Applications)
Corr$_2$=CORREL(10-yr Constant Maturity Securities Interest Rate, Loan Funding)
Corr$_3$=CORREL(Unemployment Rate, Loan Funding)

Weighted External Indicator Forecast (WEIF)

$$WEIF = \sum_{i=1}^{n} W_i D_{Ei} = W_1 D_{E1} + W_2 D_{E2} + W_3 D_{E3},$$

where n=3

WEIF Accuracy $$WEIF\ Accuracy = 1 - \frac{\sqrt{(Actual - Forecast)^2}}{Actual}$$

Calculation of Weights for Equations Based on Internal Forecasts

Let n, m be the number of equations to be weighted.

$$W_i = \frac{|Corr_i|}{\sum_{j=1}^{m}|Corr_j|} = \frac{|Corr_i|}{|Corr_1|+|Corr_2|+\ldots+|Corr_m|}$$

Note that this method means that the sum of weights is equal to one, i.e. $\sum_{i=1}^{n} W_i = 1$ Corr$_1$=CORREL(Actual Loan Applications, Forecast Loan Applications)
Corr$_2$=CORREL(Actual Loan Funding, Forecast Loan Funding)

Weighted Internal Forecast (WIF)

$$WIF = \sum_{i=1}^{n} W_i D_{IFi} = W_1 D_{IF1} + W_2 D_{IF2},$$

where n=2
WIF Accuracy $$WIF \; Accuracy = 1 - \frac{\sqrt{(Actual - Forecast)^2}}{Actual}$$

Combined Forecast (Internal & External)
Average Correlation for External Indicator Forecasts: As the basis for the weight assigned to the Weighted External Indicator Forecast (WEIF), find the average correlation for the various External Indicator predictions, as follows:

$$AverageCorrelation_{External} = \frac{1}{n}\sum_{i=1}^{n} Corr_i$$

Correlation for Internal Forecast: As the basis for the weight assigned to the Weighted Internal Forecast (WIF), use the correlation between the forecast prediction and the actual values:

$$AverageCorrelation_{Internal} = \frac{1}{n}\sum_{i=1}^{n} Corr_i$$

Weights: Using the above Average Correlations, we calculate the equation weights as follows:

$$Weight_{External} = \frac{AverageCorrelation_{External}}{AverageCorrelation_{External} + Correlation_{Internal}}$$

$$Weight_{Internal} = \frac{Correlation_{Internal}}{AverageCorrelation_{External} + Correlation_{Internal}}$$

Range Name Definitions
This section defines the named ranges used within the CMI spreadsheet.
The spreadsheet contains no named ranges.
Macros
This section contains the code for all macros created within the CMI spreadsheet.
No macros were created within the CMI spreadsheet.
Functions
This section contains the code for all custom functions created within the CMI spreadsheet.
No custom functions were developed within the CMI spreadsheet.
External Links
This section documents all external links, e.g. to other spreadsheet files, etc. within the CMI spreadsheet.
No external links are maintained within the CMI spreadsheet.
Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

What is claimed is:
1. A computer implemented method that derives an algorithm for a Capacity Management Index (CMI) that is used in an enterprise strategy process for managing capacity, comprising the steps of:
defining Capacity Management Index (K) as a sum of all Service Indices ($S_S$), weighted according to a predetermined significance of their individual contributions;
defining a Service Index ($S_S$) as a sum of all Component Indices ($C_C$) for that Service, weighted according to a relative importance of their individual contributions;
defining a Component Index ($C_C$) for a given component as a ratio of a demand ($D_C$) for that Component to a capacity ($k_C$) of that Component;
interpreting, by at least one computing device, the Component Index ($C_C$) as follows:
$C_C$<1 Capacity exceeds Demand;
$C_C$=1 Capacity equals Demand; and
$C_C$>1 Demand exceeds Capacity;
inserting, by the at least one computing device, the definition of the Component Index ($C_C$) into the definition for the Service Index ($S_S$) and inserting the definition of the Service Index ($S_S$) into the definition for the CMI (K) and obtaining a CMI (K) that represents an aggregate index over all Lines of Business (L);
incorporating, by the at least one computing device, additional Demand considerations by recognizing them as demands of a Technology Infrastructure Group (TIG);
incorporating, by the at least one computing device, demand forecasting upon the Lines of Business;
wherein if using measured data, then K represents an Actual CMI;
wherein if using forecast data, then K represents any of an Historical or a Future forecast CMI, respectively depending on a predetermined time interval;
including, by the at least one computing device, a confidence factor (F) that is based upon an observed deviance of historical forecast values from values that are actual and measured;
adjusting, by the at least one computing device, the confidence factor (F) by a time-based factor (T);
including, by the at least one computing device, external factors by establishing a correlation between external factor and internal business metric, by establishing a correlation between internal business metric and service metric, and by using derivations to define a relationship between external factors and service demand;
combining, by the at least one computing device, a set of internal Future forecasts ($K_{Future}$) with a set of External Indicators ($K_{Ee}$), weighted such that a given forecasts contribution to a Combined forecast ($K_{combined}$) is proportional to a relative strength of its correlation to the Actual CMI ($K_{Actual}$); and
adding, by the at least one computing device, Overhead demand ($D_O$) and Buffer demand ($D_B$) for each component to form a resultant K;
responsive to adding Overhead demand and Buffer demand, using said resultant K in an enterprise strategy process for managing capacity.
2. The method of claim 1, wherein to normalize K, set a sum of all Service weights to be equal to one; and to normalize $S_S$, set a sum of all Component weights be equal to one.

3. The method of claim 1, wherein if a given Line of Business develops a set of demand forecasts based upon different business volume metrics, then combine the demand forecasts, weighting each according to a strength of its correlation with actual values.

4. The method of claim 1, further comprising:
combining a number of forecasts by weighting each one according to a strength of its correlation with actual data, and then adding them together making no distinction by an internal or external origin of forecasts.

5. The method of claim 1, further comprising:
combining internal and external forecasts for a given Line of Business within a demand term for each individual component ($D_C$).

6. The method of claim 1, wherein a Weighted External Indicator Forecast (WEIF) for demand and a Weighted Internal Forecast (WIF) demand for a given Component for a given Line of Business are each composed of a series of weighted external and internal demand forecasts, respectively.

* * * * *

UNITED STATES PATENT AND TRADEMARK OFFICE
CERTIFICATE OF CORRECTION

PATENT NO. : 8,818,840 B2  
APPLICATION NO. : 13/617854  
DATED : August 26, 2014  
INVENTOR(S) : Brian M. Gilpin et al.

Page 1 of 1

It is certified that error appears in the above-identified patent and that said Letters Patent is hereby corrected as shown below:

In the Specification

Column 24, Line 38: delete "asses" and insert --assess--

In the Claims

Column 30, Claim 1, Line 55: delete "a given forecasts contribution" and insert --a given forecast's contribution--

Signed and Sealed this
Twenty-fifth Day of August, 2015

Michelle K. Lee
*Director of the United States Patent and Trademark Office*